(12) United States Patent
Gross

(10) Patent No.: US 7,508,623 B2
(45) Date of Patent: Mar. 24, 2009

(54) MULTI-PURPOSE FLOW CONTROL DEVICE COMPRISED IN A DATA STORAGE DEVICE

(75) Inventor: Hany M. Gross, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 417 days.

(21) Appl. No.: 11/354,357

(22) Filed: Feb. 14, 2006

(65) Prior Publication Data

US 2007/0188914 A1     Aug. 16, 2007

(51) Int. Cl.
  *G11B 33/02*   (2006.01)
  *G11B 33/14*   (2006.01)
(52) U.S. Cl. ................................ 360/97.02
(58) Field of Classification Search ........... 360/97.02, 360/97.03
See application file for complete search history.

(56) References Cited

U.S. PATENT DOCUMENTS

| | | | | |
|---|---|---|---|---|
| 5,189,574 A | | 2/1993 | Imamura et al. | 360/234.2 |
| 5,541,791 A | | 7/1996 | Yamasaki et al. | 360/256.1 |
| 5,631,787 A | | 5/1997 | Huang et al. | 360/97.02 |
| 5,696,649 A | | 12/1997 | Boutaghou | 360/97.03 |
| 5,752,803 A | * | 5/1998 | Wetzel et al. | 415/182.1 |
| 6,064,547 A | | 5/2000 | Wittig et al. | 360/98.08 |
| 6,091,570 A | | 7/2000 | Hendriks | 360/97.03 |
| 6,097,568 A | | 8/2000 | Ekhoff | 360/97.02 |
| 6,125,003 A | | 9/2000 | Tsuda et al. | 360/97.03 |
| 6,172,843 B1 | | 1/2001 | Genheimer et al. | 360/97.01 |
| 6,208,484 B1 | | 3/2001 | Voights | 360/97.02 |
| 6,220,012 B1 | * | 4/2001 | Hauser et al. | 60/772 |
| 6,266,208 B1 | | 7/2001 | Voights | 360/97.02 |
| 6,369,977 B1 | * | 4/2002 | Imai et al. | 360/97.02 |
| 6,369,978 B1 | | 4/2002 | Shimizu | 360/97.03 |
| 6,462,901 B1 | | 10/2002 | Tadepalli | 360/97.03 |
| 6,507,462 B1 | | 1/2003 | Gibbs et al. | 360/264.7 |
| 6,542,328 B2 | | 4/2003 | Harrison et al. | 360/97.03 |
| 6,545,842 B2 | | 4/2003 | Rao et al. | 360/244.2 |
| 6,549,365 B1 | | 4/2003 | Severson | 360/97.02 |
| 6,560,066 B2 | | 5/2003 | Imai et al. | 360/97.02 |
| 6,600,626 B2 | | 7/2003 | Shimizu et al. | 360/97.03 |

(Continued)

FOREIGN PATENT DOCUMENTS

EP     1249839 A1     10/2002

*Primary Examiner*—Jefferson Evans
(74) *Attorney, Agent, or Firm*—Westman, Champlin & Kelly, P.A.

(57) ABSTRACT

A device includes a first partial, circular shroud which includes an upstream shroud portion and a downstream shroud portion; an upstream slot panel, defining an upstream bypass slot, disposed on the upstream shroud portion; and a downstream slot panel, defining a downstream reentry slot, disposed on the downstream shroud portion. According to one embodiment, an upstream dam is disposed on the upstream shroud portion, and a downstream dam is disposed on the downstream shroud portion. Upstream and downstream slot fins may be integrally formed with the respective upstream and downstream slot panels, extending radially outward from the respective portions of the shroud. A diverter is disposed on the upstream shroud portion, substantially between the first upstream dam and the upstream bypass slot, extending radially inward therefrom, in one embodiment. A separator plate is disposed on an intermediate portion of the shroud, extending radially inward therefrom, in one embodiment. As one example, the device is useful for manipulating flow associated with a spinning disc, such as in a disc drive.

20 Claims, 11 Drawing Sheets

U.S. PATENT DOCUMENTS

| | | | |
|---|---|---|---|
| 6,624,966 B1 | 9/2003 | Ou-Yang et al. | 360/97.02 |
| 6,665,139 B2 | 12/2003 | Tokuyama et al. | 360/97.02 |
| 6,714,379 B1 | 3/2004 | Thompson et al. | 360/97.02 |
| 6,717,768 B2 | 4/2004 | Kim | 360/97.02 |
| 6,927,936 B2 * | 8/2005 | Imai et al. | 360/97.02 |
| 6,930,856 B2 * | 8/2005 | Wang et al. | 360/97.02 |
| RE39,733 E * | 7/2007 | Morris et al. | 415/111 |
| 7,281,437 B2 * | 10/2007 | Berkovitch | 73/861.79 |
| 2002/0036862 A1 | 3/2002 | Tsang et al. | 360/97.02 |
| 2002/0039253 A1 * | 4/2002 | Imai et al. | 360/97.02 |
| 2002/0135933 A1 | 9/2002 | Harrison et al. | 360/97.02 |
| 2003/0156352 A1 | 8/2003 | Voights et al. | 360/97.02 |
| 2003/0197974 A1 | 10/2003 | Hong et al. | 360/97.02 |
| 2005/0152775 A1 * | 7/2005 | Japikse et al. | 415/1 |
| 2006/0066993 A1 * | 3/2006 | Agematsu et al. | 360/97.03 |
| 2007/0002490 A1 * | 1/2007 | Suwa et al. | 360/97.02 |

* cited by examiner

MULTI-PURPOSE FLOW CONTROL DEVICE COMPRISED IN A DATA STORAGE DEVICE

FIELD OF THE INVENTION

The present invention relates to systems and devices for controlling fluid dynamic flow, and more particularly but not by limitation, to systems and devices for controlling flow in disc drives.

BACKGROUND OF THE INVENTION

In a system with rapidly rotating or moving parts, a flow of a fluid surrounding such parts may exhibit fluctuations (in pressure and/or velocity) or form turbulent patterns that exert undesirable fluid dynamic forces on components of the system. As one example, in data storage systems such as disc drives, the positioning of a read/write head relative to a track that is being accessed and/or its distance from the disc surface (commonly referred to as fly height) are subject to mechanical and vibrational disturbances due to a variety of sources, including fluid turbulence, resonant vibration modes, physical imperfections of the mechanical components, and external shocks, for example. The performance of a data storage system depends on the precision with which the read/write head is positioned proximate to target data tracks. The various mechanical and vibrational disturbances to which the head becomes subjected tend to counteract that precision, potentially causing "runout" errors in the signals intended to be read from the target data tracks. Some of those runout errors may be repeatable, manifesting as a superfluous periodic signal component such as those due to flaws in a rotating disc on which the data tracks are written. Other runout errors may be irregular and non-repeatable, such as those due to external shock, or to the fluctuations and/or turbulence of flow that may be generated by a rotating disc and adjacent components. Flow impinges upon the actuator arms and head gimbal assemblies (HGAs) that position read/write heads over the discs. The flow excites various mechanical vibration modes of the arms, HGAs, and discs that cause read/write head fly height fluctuations and off-track motion, which results in non-repeatable runout errors. In particular, arm/HGA sway modes, torsion modes, and bending modes are typically excited. As areal densities of disc drives increase, and the speed of rotation of the discs increases, the problems with non-repeatable runout due to flow excitation become a more severe performance constraint. This is representative of a variety of systems in which controlling fluid flow is becoming one of the primary obstacles in the path of continued advances in performance.

Systems, devices and methods are needed to control fluid flow, in order to reduce off-track vibrations and fly height fluctuations in disc drives with higher areal densities and higher disc speeds. Embodiments of the present invention provide solutions to these and other problems, and offer additional advantages over the prior art.

BRIEF SUMMARY OF THE INVENTION

A device is disclosed that includes a first partial, circular shroud which includes an upstream shroud portion and a downstream shroud portion; an upstream slot panel, defining an upstream bypass slot, disposed on the upstream shroud portion; and a downstream slot panel, defining a downstream reentry slot, disposed on the downstream shroud portion. According to one embodiment, an upstream dam is disposed on the upstream shroud portion, and a downstream dam is disposed on the downstream shroud portion. Upstream and downstream slot fins may be integrally formed with the respective upstream and downstream slot panels, extending radially outward from the respective portions of the shroud (the radial, axial, and circumferential axis, and associated directions are defined below). A diverter is disposed on the upstream shroud portion, substantially between the first upstream dam and the upstream bypass slot, extending radially inward therefrom, in one embodiment. A separator plate is disposed on an intermediate portion of the shroud, extending radially inward therefrom, in one embodiment.

As one example, the device is useful for manipulating flow associated with a spinning disc, such as in a disc drive. Such an embodiment including a disc drive, includes a base deck, a hub disposed on the base deck, and at least one disc rotatably mounted on the hub. According to one embodiment, an actuator is disposed on the base deck, and rotatably actuable for supporting a transducer substantially adjacent to a first surface of the disc. A base deck channel is disposed along a path on the base deck from an upstream channel inlet, adjacent to the disc cavity, to a downstream channel outlet, adjacent to the disc cavity. A first flow control component is disposed on the base deck. The first flow control component includes a partial, circular shroud that includes an upstream shroud portion, and a downstream shroud portion circumferentially opposing the upstream shroud portion. The partial, circular shroud is disposed on the base deck radially opposing a radial periphery of the disc or discs, along with a spacing between an adjacent pair of discs, in one embodiment. The first flow control component also includes an upstream dam disposed on and extending radially inward from the upstream shroud portion, and suspended axially adjacent to the first surface of the disc, and a downstream dam disposed on and extending radially inward from the downstream shroud portion, and suspended axially adjacent to the first surface of the disc, in this embodiment. The first flow control component also includes a first upstream slot panel, disposed on the upstream shroud portion and defining an upstream bypass slot and an upstream channel inlet; and a first downstream slot panel, disposed on the downstream shroud portion and defining a downstream reentry slot and a downstream channel outlet, according to one embodiment.

These and other embodiments of the present invention provide various advantages and benefits in resolving performance constraints of the past. For example, according to one embodiment, a flow control device installed in a disc drive diverts much of the flow away from the zone occupied by the actuator arms and transducers, thereby reducing the flow speed and/or fluctuations in the vicinity of the actuator arms and the read/write heads. This thereby helps to prevent mechanical excitation of the actuator arms and head gimbal assemblies, thereby helping to reduce off-track motion and fly height fluctuations of the read/write heads suspended on the head gimbal assemblies above respective data tracks of the respective discs of the disc drive, in this illustrative embodiment.

Additional objectives, features, and advantages of various embodiments of the present invention may be discerned through the corresponding description and figures, and inferred by those in the art from the general teaching of the present disclosure and in the course of practicing, manufacturing, using, and otherwise experiencing different embodiments, as defined by the appended claims.

DETAILED DESCRIPTION OF ILLUSTRATIVE EMBODIMENTS

Figure 1:
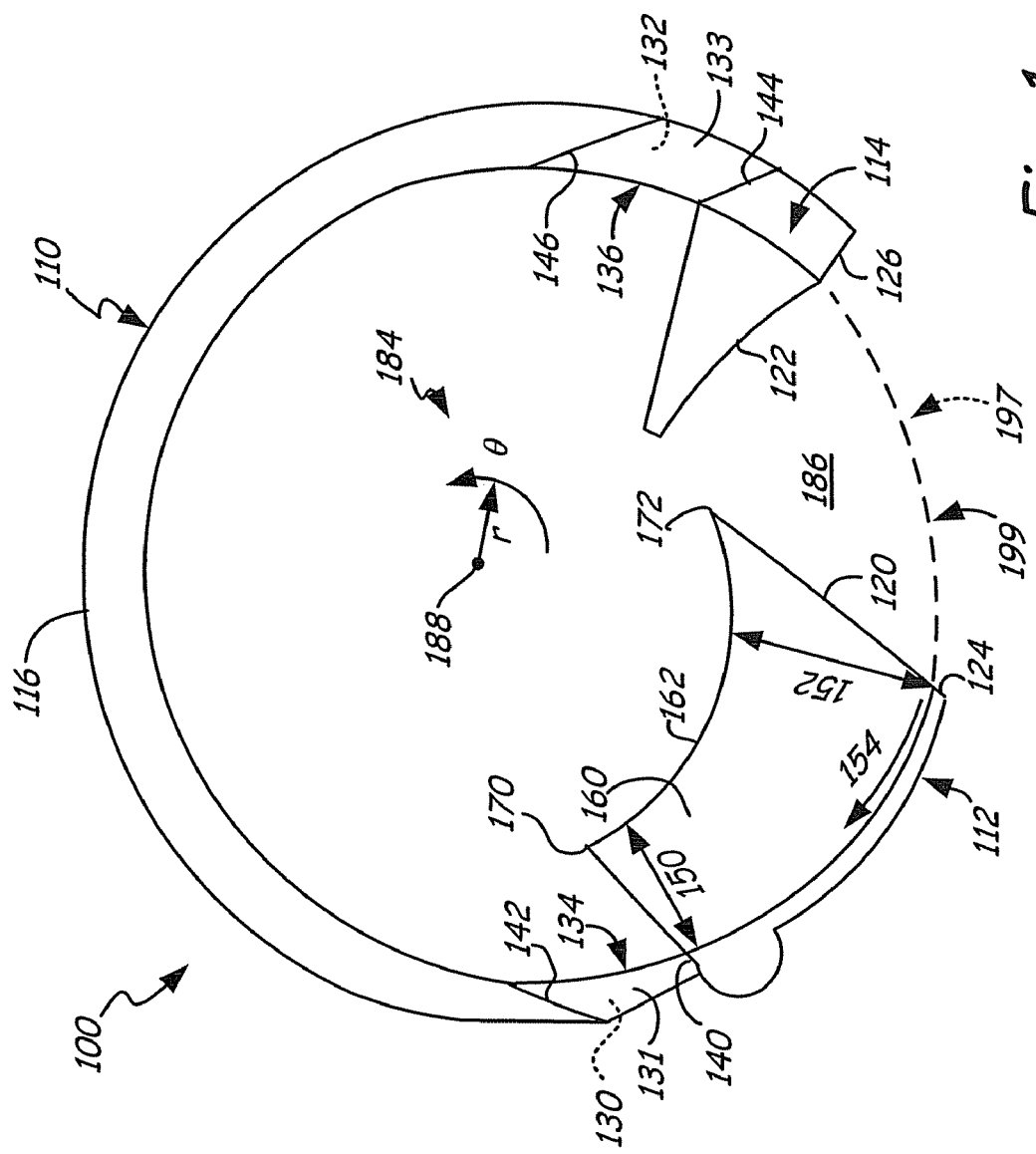
FIG. 1 illustrates a top view of a flow control device, according to one embodiment.
Figure 2:
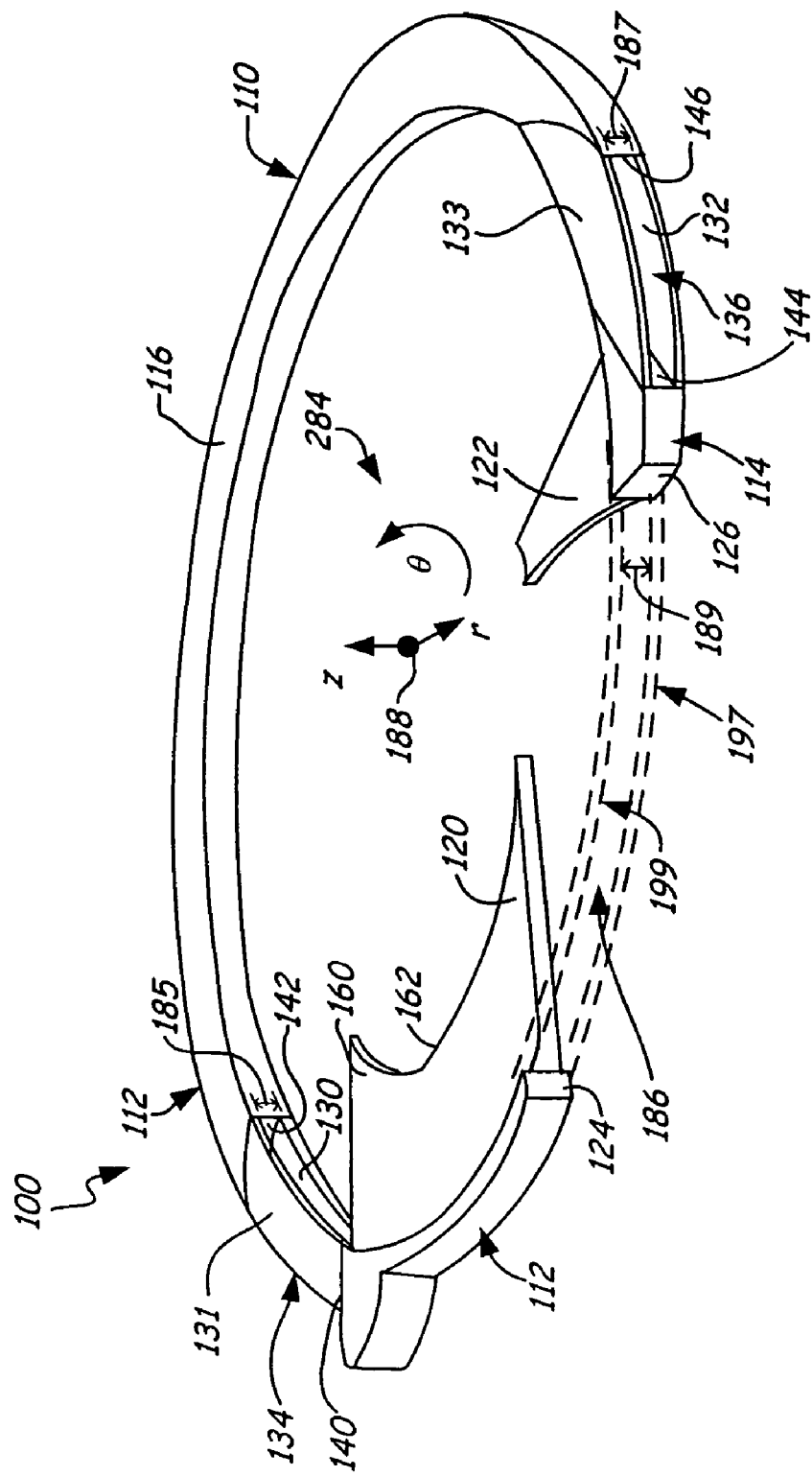
FIG. 2 illustrates an oblique view of a flow control device, according to an embodiment.

FIG. 1 illustrates a top view of a flow control device 100, according to one embodiment. FIG. 2 illustrates an oblique view of flow control device 100, according to the embodiment of FIG. 1, in which axially extended features of flow control device 100 can be better appreciated. Flow control device 100 includes partial, circular shroud 110, upstream dam 120, downstream dam 122, upstream slot panel 131 and axially opposing upstream slot panel 130 (underneath upstream slot panel 131) defining upstream bypass slot 134, and downstream slot panel 133 and axially opposing downstream slot panel 132 (underneath downstream slot panel 133) defining downstream reentry slot 136. Partial, circular shroud 110 includes upstream shroud portion 112, downstream shroud portion 114, and intermediate shroud portion 116. Upstream dam 120 and upstream slot panels 130 and 131, which define upstream bypass slot 134, are disposed on upstream shroud portion 112. Downstream dam 122 and downstream slot panels 132 and 133, which define downstream reentry slot 136, are disposed on downstream shroud portion 114. Upstream dam 120 and downstream dam 122 are bluff bodies extending radially inward from their respective portions of partial, circular shroud 110.

Flow control device 100 is useful, for example, in a disc drive (depicted in later figures, not in FIG. 1), where partial, circular shroud 110 is disposed radially around a periphery of at least two adjacent discs, disc 199 (depicted in dashed lines) and axially opposing disc 197 (visible in FIG. 2, depicted in dashed lines) and the axial spacing 189 between them. In the orientation depicted in FIGS. 1 and 2, the lower surfaces of slot panels 131 and 133 axially oppose the upper surfaces of slot panels 130 and 132 across upstream bypass slot 134 and downstream reentry slot 136, respectively, just as the lower surface of disc 199 axially opposes the upper surface of disc 197. Flow control device 100 is axially aligned with the discs 199, 197, such that the upper surfaces of slot panels 130 and 132 are substantially axially coplanar with the upper surface of disc 197, and have very little radial separation from disc 197; and such that the lower surfaces of slot panels 131 and 133 are substantially axially coplanar with the lower surface of axially adjacent disc 199, and with very little radial separation from disc 199. In this way, upstream bypass slot 134 and downstream reentry slot 136 are aligned with the spacing 189 between the two discs 197, 199. The upper surfaces of slot panels 130 and 132 are substantially axially coplanar with the upper surface of disc 197, in this embodiment, in that they are axially coplanar to within normal tolerances of manufacture; the same applies to the lower surfaces of slot panels 131 and 133 and disc 199.

Slot panels 130 and 132 are axially offset from upstream dam 120, downstream dam 122, and diverter 160, the three of which are disposed roughly at the axial center of partial, circular shroud 110 (and thereby referred to as "the axially centered components"), in this embodiment. Slot panels 130, 132 are offset axially lower than the axially centered components, while slot panels 131, 133 are offset axially higher than the axially centered components. Slot panels 130, 132 are thereby disposed to be axially coplanar with disc 197, and slot panels 131, 133 are disposed to be axially coplanar with disc 199, while the axially centered components are disposed to occupy the axial spacing 189 between discs 197 and 199.

When discs 197, 199 are rotated, counterclockwise in the perspective of FIG. 1, their friction with a fluid medium between the discs, such as air, causes a circumferential flow interior to partial, circular shroud 110. The alignment of flow control device 100 with the discs allows this flow to pass from the spacing 189 between discs 197, 199 through upstream bypass slot 134, and from downstream reentry slot 136 into the spacing 189 between discs 197, 199. The spacing 185 between slot panels 130 and 131 and the spacing 187 between slot panels 132 and 133, measure substantially the same axial height as the disc-to-disc spacing 189 between these two discs 197, 199, in this embodiment. This helps to ensure that the flow is smooth and streamlined from the spacing 189 between discs 197, 199 and interior to partial, circular shroud 110, outward through upstream bypass slot 134, and from exterior to partial, circular shroud 110 inward through downstream reentry slot 136 to the spacing 189 between discs 197, 199, without potentially fluctuation-inducing steps between the two.

The function of upstream bypass slot 134 and downstream reentry slot 136 in guiding the flow may be further aided, as in this embodiment, by upstream dam 120 and downstream dam 122, which extend across the path of the flow and substantially block the circumferential component of the flow; and by diverter 160, which has a bluff body extending radially inward, configured to divert the circumferential flow outward toward the upstream bypass slot 134.

The flow is thereby bounded circumferentially by partial, circular shroud 110 and axially by discs 197 and 199. The flow would be substantially diverted by diverter 160 to exit the interior of partial, circular shroud 110 through upstream bypass slot 134 as it passed in the vicinity of upstream shroud portion 112; while downstream dam 122 would substantially retard the flow in region 186. In addition, the low pressure created in the wake of downstream dam 122 enhances the flow from radially exterior to downstream shroud portion 114 through downstream reentry slot 136 to replenish the counterclockwise flow radially interior to partial, circular shroud 110. Flow control device 110, as one example of its inventive use, thereby provides for a relatively slow flow in region 186 despite a generally faster rotational flow through the interior of partial, circular shroud 110, such as might be motivated by the rapid rotation of axially adjacent discs 197 and 199, according to the present embodiment.

In other words, means are provided, including upstream bypass slot 134, for guiding a flow that is radially interior to partial, circular shroud 110 to pass radially outward therefrom proximate to upstream shroud portion 112. Means are also provided, including downstream reentry slot 136, for guiding a flow that is radially exterior to partial, circular shroud 110 to pass radially inward thereof proximate to downstream shroud portion 114.

The division of partial, circular shroud 110 into upstream shroud portion 112, downstream shroud portion 114, and intermediate shroud portion 116 is done for reference, and follows no absolute, natural distinctions among the three. Rather, upstream shroud portion 112 is generally the portion of partial, circular shroud 110 leading up to upstream terminus 124; downstream shroud portion 114 is generally the portion of partial, circular shroud 110 leading up to downstream terminus 126; and intermediate shroud portion 116 is generally the portion of partial, circular shroud 110 connecting upstream shroud portion 112 and downstream shroud portion 114, and lying between those two shroud portions along the circular, roughly constant-radius path of partial, circular shroud 110, rather than between in an absolute or straight-line direction.

Additional reference is made in cylindrical coordinates in this description, wherein the circumferential direction is understood to be a constant-radius direction around central point 188 of flow control device 100; a radial direction is understood to be inward toward or outward away from central point 188 of flow control device 100; and an axial direction is understood to be upward and downward, into and out of the page as seen in FIG. 1, and depicted as upward and downward in the oblique view of FIG. 2, perpendicular to the plane in which partial, circular shroud 110 is substantially extended. This is illustrated with coordinate basis 184 in FIG. 1, and coordinate basis 284 in FIG. 2.

Coordinate basis 184 depicts two dimensions of a basis using linearly independent cylindrical coordinates for describing the dimensions of flow control device 100. In this cylindrical coordinate basis, the "r" coordinate corresponds to a radial measurement, radiating outward from the central axis of the flow control device, in the plane in which the flow control device substantially extends; while the "θ" coordinate corresponds to a circumferential measurement, rotated around the central axis of the flow control device substantially in the plane in which the flow control device is substantially extended.

FIG. 2 illustrates coordinate basis 284, identical to coordinate basis 184 of FIG. 1 except also to depict a "Z" component, corresponding to an axial dimension, perpendicular or "up and down" relative to the plane in which the flow control device is substantially extended, and substantially serving as a central axis of the flow control device. Coordinate basis 284 thereby forms a three-dimensional basis for the radial, circumferential, and axial orientations.

Upstream shroud portion 112 comes to an end, circumferentially, at upstream terminus 124, and downstream shroud portion 114 comes to an end, circumferentially, at downstream terminus 126. Region 186, in this embodiment, forms a gap in the circular shape of partial, circular shroud 110, extending circumferentially generally between upstream terminus 124 and upstream dam 120 on one side, and downstream terminus 126 and downstream dam 122 on the other side. Region 186 has its axial boundaries at discs 197 and 199, when flow control device 100 is disposed in alignment with them in an application such as the embodiment of FIGS. 1 and 2.

Upstream dam 120 is disposed on upstream shroud portion 112 proximate to upstream terminus 124, and downstream dam 122 is disposed on downstream shroud portion 114 proximate to downstream terminus 126, in this embodiment. That is, upstream dam 120 and downstream dam 122 are each disposed on their respective portions of partial, circular shroud 110. This takes into account that either of these dams may extend over a considerable fraction of the circumference of partial, circular shroud 110, as is particularly the case with upstream dam 120 in the embodiment of FIG. 1.

Upstream slot panel 130 is also disposed on upstream shroud portion 112, circumferentially toward intermediate shroud portion 116 in this embodiment. Upstream bypass slot 134 is defined as the space axially between axially opposing upstream slot panels 130 and 131, and circumferentially between the pair of circumferentially opposing upstream slot walls 140 and 142 (depicted in FIG. 2) of upstream shroud portion 112. Upstream bypass slot 134 lies circumferentially toward intermediate shroud portion 116 from upstream dam 120, in this embodiment. Conversely, upstream dam 120 is disposed circumferentially away from intermediate shroud portion 116 and toward upstream terminus 124, relative to upstream bypass slot 134, in this embodiment. Upstream bypass slot 134 thereby allows the flow to bypass region 186.

Similarly, downstream reentry slot 136 is defined as the space axially between axially opposing downstream slot panels 132 and 133, and circumferentially between the pair of circumferentially opposing upstream slot walls 144 and 146 (depicted in FIG. 2) of downstream shroud portion 114. Downstream slot panel 132 lies circumferentially toward intermediate shroud portion 116 from downstream dam 122, in this embodiment. Conversely, downstream dam 122 is disposed circumferentially away from intermediate shroud portion 116 and toward downstream terminus 126, relative to downstream reentry slot 136, in this embodiment. Downstream reentry slot 136 thereby allows the flow to reenter the radial interior of partial, circular shroud 110.

Diverter 160 is disposed on upstream shroud portion 112. In this embodiment, diverter 160 is disposed on upstream shroud portion 112 substantially between upstream dam 120 and upstream bypass slot 134. Diverter 160 extends radially inward from upstream shroud portion 112, toward central point 188 of flow control device 100. Diverter 160 is formed integrally with upstream dam 120, meaning they are unitarily constructed, in this embodiment.

Diverter 160 has radially inner edge 162. The radial dimension of inner edge 162 varies from the relatively smaller radial dimension 150 measured in a radial line at the far end of diverter 160 from upstream terminus 124, to the relatively greater radial dimension 152 measured in a radial line at the near end of diverter 160 to upstream terminus 124. Circumferential path 154 circumferentially away from proximate to upstream terminus 124 indicates angular separation from the angular position of upstream terminus 124. Inner edge 162 thereby follows a spiral path, from apex 170, relatively close to upstream bypass slot 134 and relatively far from central point 188 at its point of greatest angular separation from upstream terminus 124, along a curved path, to apex 172, relatively farther from upstream bypass slot 134 and relatively nearer to central point 188 where it has less angular separation from upstream terminus 124, and even coincides with and continues on the other side of the angular position of upstream terminus 124 in terms of angular separation about central point 188, so that diverter 160 and upstream dam 120 (which are combined into one continuous body in this embodiment) extend toward and define a partial boundary of region 186.

FIG. 2 better demonstrates the axial features of flow control device 100. For example, it depicts upstream dam 120 and diverter 160 being tapered from a base axial thickness radially adjacent to upstream shroud portion 112, to a narrower axial thickness extending radially inward from upstream shroud portion 112 toward central point 188, according to one embodiment. Downstream dam 122 is also tapered from a base axial thickness radially adjacent to downstream shroud portion 114, to a narrower axial thickness extending radially inward from downstream shroud portion 114 toward central point 188. Such axial tapering of various features is also demonstrated in the later figures. This axial tapering of features that extend radially inward from portions of partial, circular shroud 110 serves, for example, to mitigate the effects of any axial deflections of vibration modes of upstream dam 120, diverter 160, downstream dam 122, or any other features that extend radially inward from portions of partial, circular shroud 110. The tapering helps ensure that even if the tapered components vibrate or are deflected up and down, such as in a transient response to a shock event, their relatively narrower far ends remain confined to a safe range of motion that does not undesirably intersect the position of an adjacent component, such as a spinning disc disposed axially adjacent to flow control device 100. Such a physical intersection might otherwise cause significant damage to the adjacent spinning disc. Upstream dam 120, diverter 160, and downstream dam 122 are also tapered circumferentially in an alternative embodiment, which may be useful for reducing flow fluctuations or vortex shedding in a circumferential flow intersecting these components, for example. In still other embodiments, as described further below, little or no tapering of the radial components may provide greater advantages in performance without posing a significant risk of contacting an adjacent spinning disc.

Figure 3:
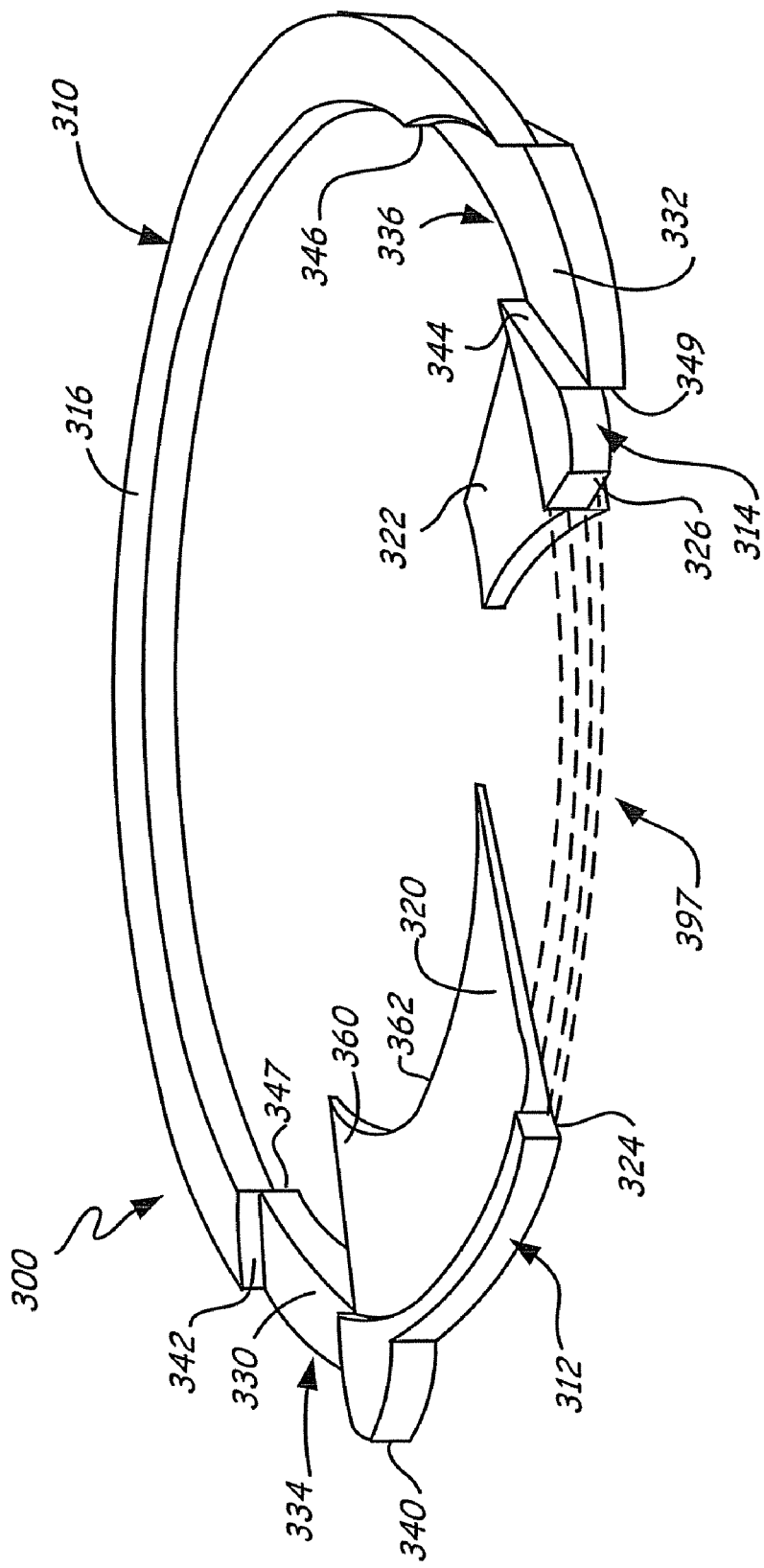
FIG. 3 illustrates an oblique view of a flow control device, according to an embodiment.

FIG. 3 illustrates an oblique view of flow control device 300, according to an embodiment similar to that of FIG. 1. Many features in FIG. 3 have reference numbers sharing the same last two digits as corresponding features in FIG. 1, to indicate their similarity. These include partial, circular shroud 310, upstream dam 320, downstream dam 322, upstream slot panel 330, upstream bypass slot 334, downstream slot panel 332, downstream reentry slot 336, upstream shroud portion 312, downstream shroud portion 314, intermediate shroud portion 316, upstream terminus 324, downstream terminus 326, and diverter 360 including inner edge 362, in a configuration similar to that of FIG. 1. For brevity, descriptions of these features are not repeated, except to indicate certain illustrative differences included in flow control device 300, such as axially protruding slot panels 330 and 332.

Upstream slot panel 330 includes axially protruding upstream slot panel portion 347, by which upstream slot panel 330 protrudes axially from upstream shroud portion 312. That is, axially protruding upstream slot panel portion 347 can be seen in FIG. 3 to protrude axially to a significantly greater extent than the surrounding portions of upstream shroud portion 312. Downstream slot panel 332 also includes axially protruding downstream slot panel portion 349, by which downstream slot panel 332 protrudes axially from downstream shroud portion 314, similarly to the case with upstream slot panel 330.

Such axially protruding slot panel portions may be useful, for instance, where it is desired to stack two similar flow control devices axially together, wherein at least one is similar to the embodiment of flow control device 300. In that case, the walls of axially protruding upstream slot panel portion 347 of the first flow control device 300 could fittingly engage with the circumferentially opposing upstream slot walls of the upstream bypass slot of the second flow control device (not depicted in FIG. 3), axially in line with circumferentially opposing upstream slot walls 340, 342 of upstream bypass slot 334 of the first flow control device 300. Similarly, the walls of axially protruding downstream slot panel portion 349 of the first flow control device 300 could fittingly engage with the circumferentially opposing downstream slot walls of the downstream reentry slot of the second flow control device (not depicted in FIG. 3), axially in line with circumferentially opposing downstream slot walls 344, 346 of downstream reentry slot 336 of the first flow control device 300.

In an alternative embodiment, protruding slot panels analogous to slot panels 330, 332 are disposed on the axially higher parts of the slot panels rather than the lower parts, and protrude axially upward, still allowing several flow control devices similar to flow control device 300 to be stacked axially together. This may be advantageous where, for example, the lowest flow control device is stacked onto a base deck (not depicted in FIG. 3, depicted in later figures) comprising its own matching slot panels.

Such axially thicker slot panels 330, 332 are therefore substantially the same axial thickness as a disc 397 (depicted in dashed lines), and axially coplanar with disc 397 on both its upper surface and its lower surface, in this embodiment as depicted in FIG. 3. Since both the upper and lower surfaces of slot panels 330, 332 are substantially axially coplanar with both the upper and lower surfaces of disc 397, in this embodiment, slot panels 330, 332 are substantially axially coplanar with disc 397. In other embodiments, such as that of FIG. 1, a slot panel and disc may be said to be substantially axially coplanar when they are aligned such that only the surface on one side of the slot panel is axially coplanar with the surface of only one side of the disc, for example.

Flow control device 300 according to the embodiment of FIG. 3 has a single slot panel such as slot panels 330, 332 on each flow control device 300 to help define each of two axially adjacent slots, i.e. upstream bypass slot 334 of flow control device 300 and the corresponding upstream bypass slot of a second flow control device disposed axially below flow control device 300, along with downstream reentry slot 336 of flow control device 300 and the corresponding downstream reentry slot of a second flow control device disposed axially below flow control device 300. Flow control device 300 thereby requires fewer total slot panels and slot panels of a larger size, which may provide advantages in making manufacturing simpler and less expensive. The axially higher slot panels for the highest disc of a disc stack, in such an embodiment, may be formed integrally with the top cover of the disc drive (not depicted in FIG. 3). Alternately, in an embodiment in which the slot panels are offset to the axially higher side of the flow control device, the axially lower slot panels for the lowest disc of a disc stack may be formed integrally with the base deck of a disc drive (not depicted in FIG. 3).

Figure 4:
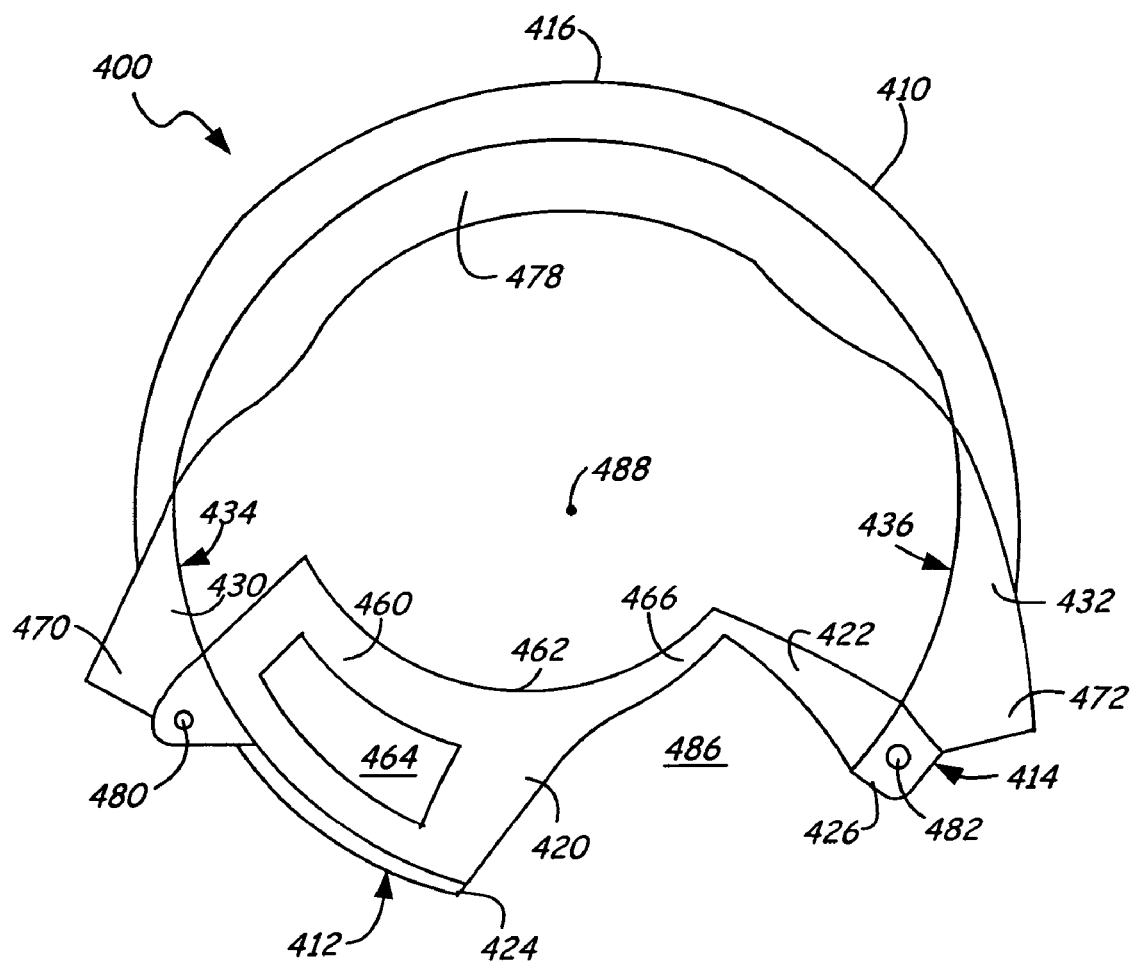
FIG. 4 illustrates a top view of a flow control device, according to one embodiment.

FIG. 4 illustrates a top view of flow control device 400, according to one embodiment. Many features in FIG. 4 have reference numbers sharing the same last two digits as corresponding features in FIG. 1, to indicate their similarity. These include partial, circular shroud 410, upstream dam 420, downstream dam 422, upstream slot panel 430, upstream bypass slot 434, downstream slot panel 432, downstream reentry slot 436, upstream shroud portion 412, downstream shroud portion 414, intermediate shroud portion 416, upstream terminus 424, downstream terminus 426, diverter 460 including inner edge 462, central point 488, region 486, in a configuration similar to that of FIG. 1. For brevity, descriptions of these features are not repeated, except to indicate certain illustrative differences included in flow control device 400, such as bridge 466, upstream slot fin 470, downstream slot fin 472, and separator plate 478, as further described below.

A portion of diverter 460, its inner edge 462, and upstream dam 420 extend farther adjacent and radially inward to region 486 to connect with downstream dam 422, at a radially inward portion thereof. This connecting portion is defined as bridge 466. Other embodiments of bridge 466 are contemplated, which also extend between and connect upstream dam 420 and downstream dam 422. Bridge 466 is useful, for instance, for adding structural rigidity to flow control device 400, particularly to diverter 460, upstream dam 420, and downstream dam 422. For example, bridge 466 may reduce axial deflections of diverter 460, upstream dam 420, and downstream dam 422. As another example of the usefulness of bridge 466, it may allow better performance in diverter 460 in diverting a flow, passing counterclockwise through the interior of flow control device 400, away from region 486. Diverter 460 and upstream dam 420 also have lightening hole 464 in this embodiment, which usefully serves to reduce the weight of flow control device 400, for example.

The inclusion of bridge 466 in this embodiment involves a performance tradeoff. Bridge 466 substantially increases the structural rigidity of upstream dam 420 and downstream dam 422, and also substantially increases the shielding of region 486, both radially, by continuing to divert the flow being guided by diverter 460, and axially, by strengthening the structure of upstream dam 420 and downstream dam 422 such that both may be made thicker and tapered less or not at all, providing less axial leakage pathways between upstream dam 420 and adjacent disc surfaces. Bridge 466 thereby provides a greater assurance of lower flow fluctuations in which read/write heads, actually suspended in region 486, may be precisely positioned by an actuator. However, in some applications involving a spinning media disc adjacent to flow control device 400, bridge 466 also occupies a region axially opposing to some inner diameter data tracks along the inner diameter of a surface of an adjacent disc, thereby obstructing access of a read/write head operating in region 486 to those inner diameter data tracks. This drawback can be solved by including a stepped bridge structure (described below in connection with FIG. 6), but this may (in some applications but not others) require a greater than optimal axial separation between discs of the disc pack. This may present no drawback at all in some applications, and a significant drawback in others. Various alternative embodiments include all of these variations.

Flow control device 400 also includes upstream slot fin 470 integrally formed with upstream slot panel 430, extending radially outward from upstream shroud portion 412, and downstream slot fin 472 integrally formed with downstream slot panel 432, extending radially outward from downstream shroud portion 414, in this embodiment. Upstream slot fin 470 further defines upstream bypass slot 434 along a greater radial extent, and downstream slot fin 472 further defines downstream reentry slot 436 along a greater radial extent. This may be useful, for example, in providing a greater extent of streamlined slot path when disposed in a larger device, such as a disc drive (not depicted in FIG. 4), in which flow control device 400 may usefully be applied. Assuring streamlining along a longer path through upstream bypass slot 434 and downstream reentry slot 436 helps reduce eddies, turbulence, pressure fluctuations, and axial or three-dimensional effects in a flow passing through these slots, and thereby helps reduce the flow fluctuations interior to flow control device 400.

Upstream slot fin 470 and downstream slot fin 472 may be tapered, similarly to upstream dam 120 with integrally formed diverter 160 and downstream dam 122 in FIG. 2 above. Upstream slot fin 470 and downstream slot fin 472 are tapered in this embodiment from a base axial thickness radially adjacent to their respective slot panels 430, 432, to a narrower axial thickness extending radially outward from partial, circular shroud 410, away from central point 488, according to this embodiment. This axial tapering serves, for example, to streamline the path of a flow from upstream bypass slot 434 to an external channel, and from an external channel to downstream reentry slot 436, for example.

Separator plate 478 extends radially inward from partial, circular shroud 410, generally from the portion thereof labeled intermediate shroud portion 416. Separator plate 478 is useful, for instance, for reducing the speed of a flow radially interior to flow control device 400. Separator plate 478 is substantially circular and extends radially inward only a fraction of the distance from partial, circular shroud 410 toward central point 488, in this embodiment. In alternative embodiments, separator plate 478 may take many forms, and extend to any proportion from partial, circular shroud 410 toward central point 488. In general, a greater radial extent for separator plate 478 will provide the advantage of a greater area in which separator plate 478 may act to retard adjacent flow, while a smaller radial extent for separator plate 478 may provide the advantages of requiring less power consumption to perform functions that induce a flow, such as to rotate discs axially adjacent to separator plate 478; and reducing the axial range of mechanical deflection of separator plate 478, such as might pose a risk to axially adjacent bodies, such as discs, for example.

Flow control device 400 also includes aperture tabs 480, 482, which may be useful, for example, to interface with corresponding attachment features with which to attach flow control device 400 to another component or fix flow control device 400 in place within a larger device, such as a disc drive (not depicted in FIG. 4), within which flow control device 400 may be usefully applied.

Figure 5:
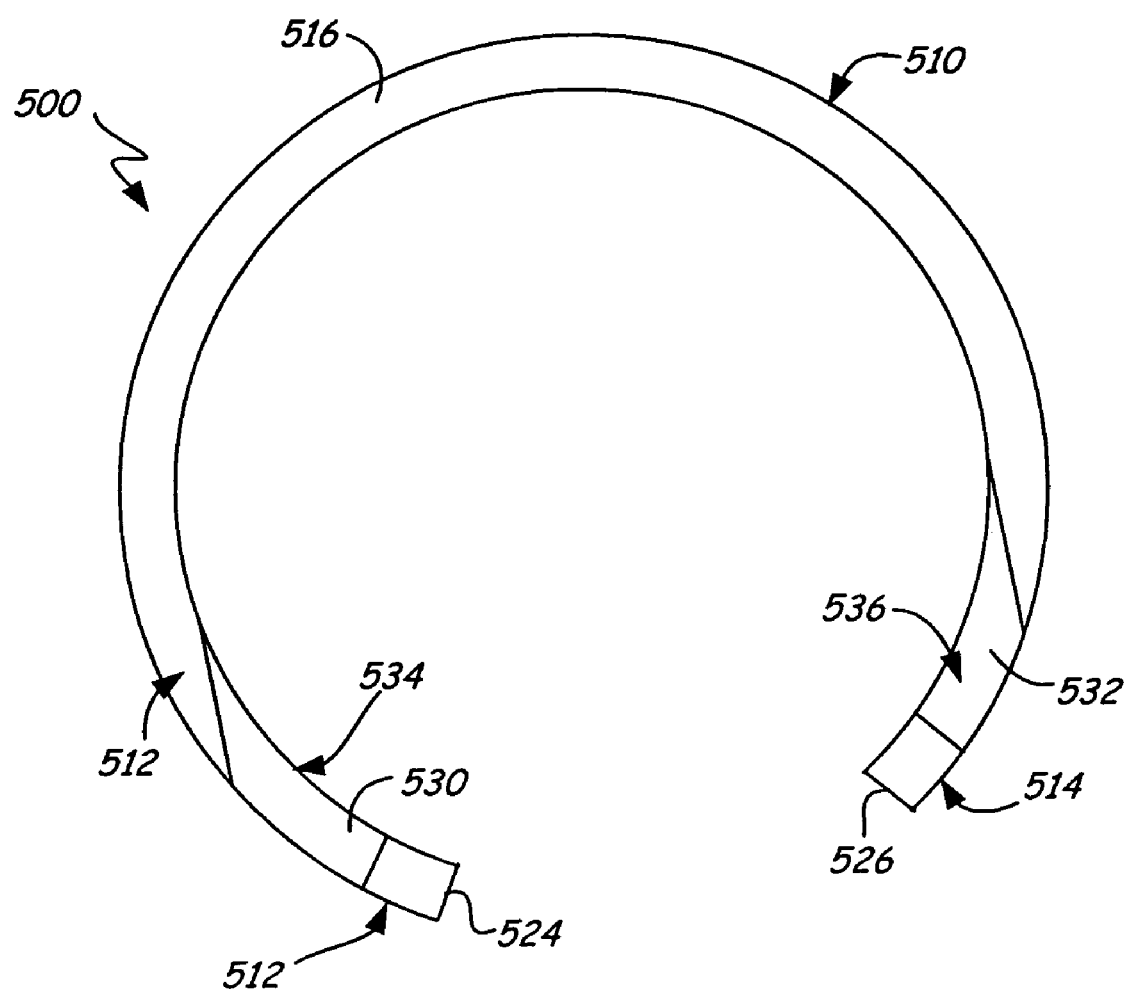
FIG. 5 illustrates a top view of a flow control device, according to one embodiment.

FIG. 5 illustrates a top view of flow control device 500, according to one embodiment. Many features in FIG. 5 have reference numbers sharing the same last two digits as corresponding features in FIG. 1, to indicate their similarity. These include partial, circular shroud 510, upstream slot panel 530, upstream bypass slot 534, downstream slot panel 532, downstream reentry slot 536, upstream shroud portion 512, downstream shroud portion 514, intermediate shroud portion 516, upstream terminus 524, and downstream terminus 526, in a configuration similar to that of FIG. 1. Flow control device 500 illustrates an embodiment that is simpler than that of FIG. 1 in some ways, such as in the absence of an upstream dam, a downstream dam, or a diverter.

Figure 6:
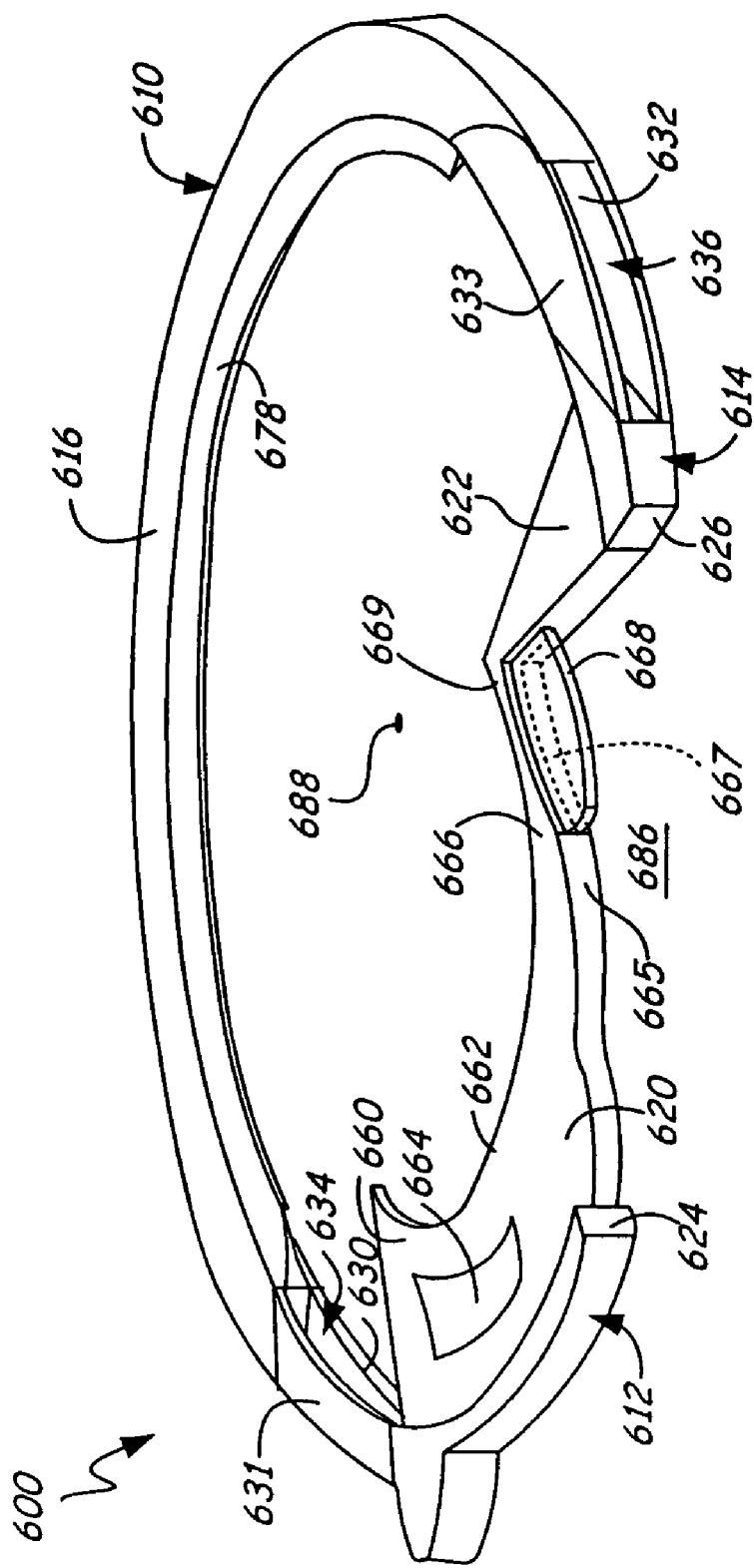
FIG. 6 illustrates an oblique view of a flow control device, according to one embodiment.

FIG. 6 illustrates an oblique view of flow control device 600, according to one embodiment. Many features in FIG. 6 have reference numbers sharing the same last two digits as corresponding features in FIG. 1, to indicate their similarity. These include partial, circular shroud 610, upstream dam 620, downstream dam 622, upstream slot panels 630 and 631, upstream bypass slot 634, downstream slot panels 632 and 633, downstream reentry slot 636, upstream shroud portion 612, downstream shroud portion 614, intermediate shroud portion 616, upstream terminus 624, downstream terminus 626, diverter 660 including inner edge 662 and gap 664, central point 688, and region 686, in a configuration similar to that of FIG. 1. For brevity, descriptions of these features are not repeated, except to indicate certain illustrative differences included in flow control device 600, such as bridge 666 having step 668, and separator plate 678, as further described below.

Bridge 666 extends between and connects upstream dam 620, along with diverter 660 and its inner edge 662, and downstream dam 622. Some of the advantages of bridge 666 are indicated above in reference to bridge 466 of FIG. 4. Bridge 666 also includes step 668. Step 668 extends circumferentially along an axially intermediate portion of radially outer surface 665 of bridge 666. This leaves step 668 as an axially extending divider through a radially inner portion of region 686, which in turn has a radially inner boundary that includes thin, axially lower bridge portion 667 (indicated in dashed lines), axially intermediate step 668, and thin, axially upper bridge portion 669 of bridge 666.

Step 668 thereby resolves the tradeoff associated with bridge 666, in embodiments with sufficient axial disc-to-disc spacing, by providing enhanced structural rigidity of bridge 666, upstream dam 620, and downstream dam 622, while also allowing read/write heads to access inner diameter data tracks, axially opposed by step 668 adjacent to axially lower and upper bridge portions 667 and 669 respectively, to read/write head operating in region 686. Step 668 thereby defines gaps in bridge 666 to prevent any loss of data storage area axially opposing bridge 666, in an illustrative embodiment incorporating data storage discs axially adjacent to flow control device 600.

Flow control device 600 also includes separator plate 678. Separator plate 678 extends radially inward from intermediate shroud portion 616 of partial, circular shroud 610. Separator plate 678 is useful, for instance, for reducing the speed of a flow radially interior to flow control device 600. Separator plate 678 is tapered from a base axial thickness radially adjacent to intermediate shroud portion 616, to a narrower axial thickness extending radially inward from intermediate shroud portion 616 toward central point 688. Such axial tapering of separator plate 678 serves, for example, to reduce the amplitude of mechanical deflection and provide a greater clearance between the separator plate 678 and a disc that may be disposed axially adjacent to separator plate 678. This serves the purpose of preventing the likelihood of separator plate 678 achieving sufficient amplitude of axial deflection to contact a component, such as a disc (not depicted in FIG. 6), which may be disposed axially adjacent to separator plate 678 when flow control device 600 is used as a component in a larger device, such as a disc drive (not depicted in FIG. 6), for example.

Figure 7:
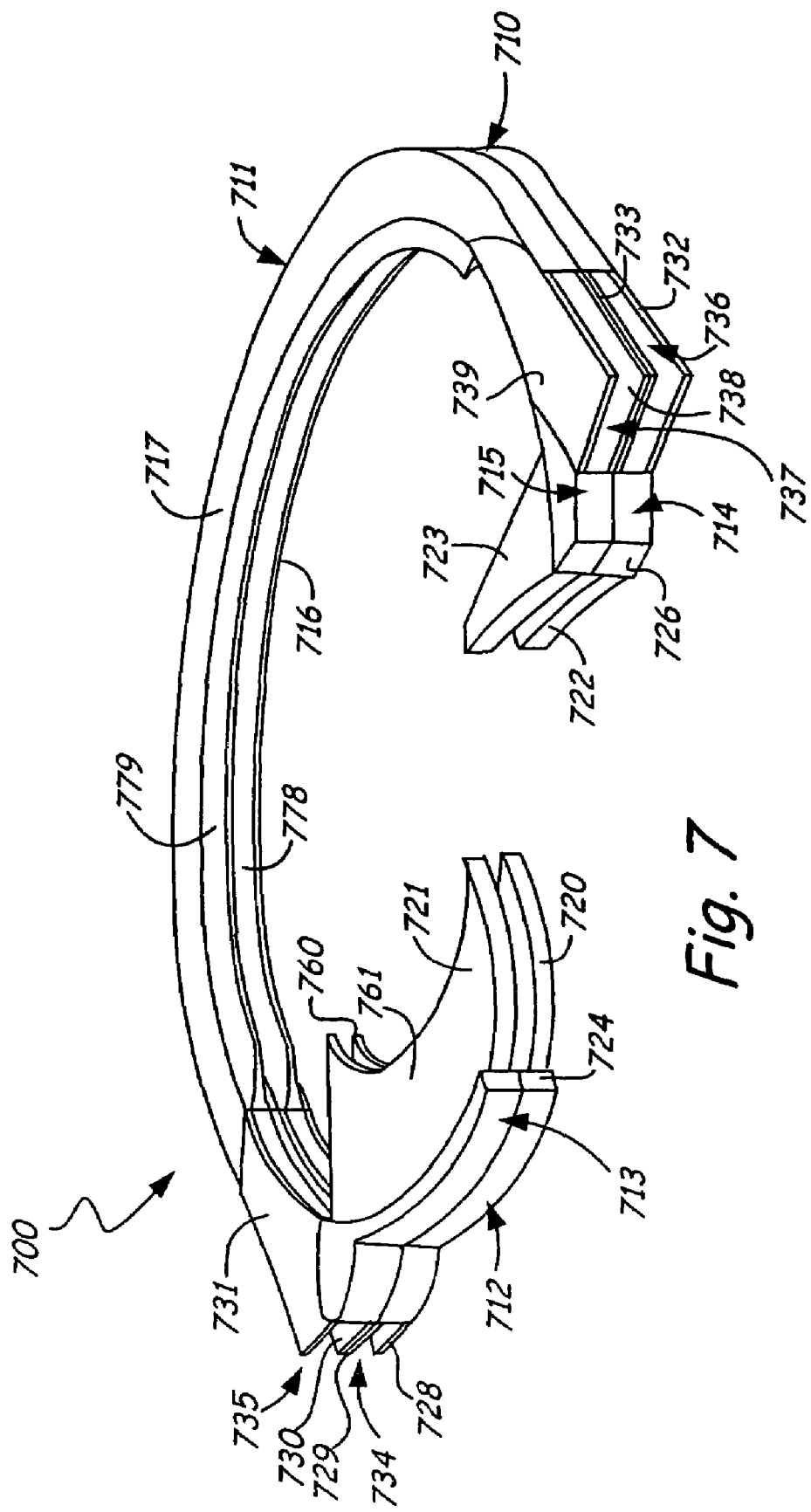
FIG. 7 illustrates an oblique view of a flow control device, according to one embodiment.

FIG. 7 illustrates an oblique view of flow control device 700, according to one embodiment. Flow control device 700 includes lower partial, circular shroud 710 and higher partial, circular shroud 711, disposed coaxially with and axially adjacent to each other. Many features of each of the two partial, circular shrouds 710, 711 in FIG. 7 are similar to corresponding features in previous figures, including partial, circular shrouds 710 and 711, upstream dams 720 and 721, downstream dams 722 and 723, upstream slot panels 728, 729, 730, and 731, upstream bypass slots 734 and 735, downstream slot panels 732, 733, 738, and 739, downstream reentry slots 736 and 737, upstream shroud portions 712 and 713, downstream shroud portions 714 and 715, intermediate shroud portions 716 and 717, upstream terminus 724, downstream terminus 726, and diverters 760 and 761, in configurations similar to that of FIG. 1 with respect to each axially stacked set of components. For brevity, descriptions of these features are not repeated, except to indicate certain illustrative differences included in flow control device 700, such as the axial stacking of two partial, circular shrouds and sets of related components together. The feature illustrated in FIG. 7 of axially stacking several partial, circular shrouds, with associated components, also occurs in other embodiments that include three, four, or any other number of partial, circular shrouds and associated components.

Figure 8:
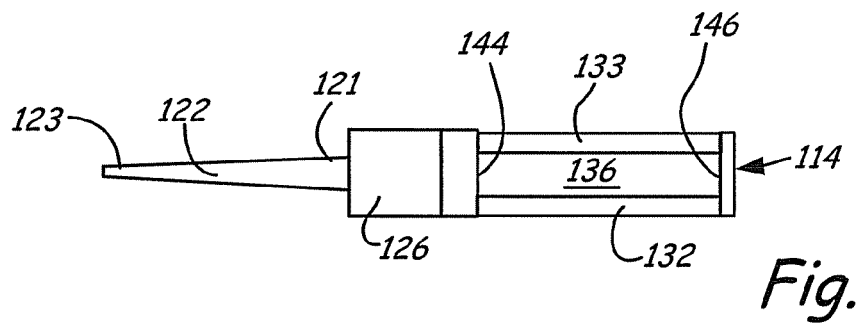
FIG. 8 illustrates a side view of a downstream shroud portion of a flow control device, according to an embodiment.

FIG. 8 illustrates a side view of downstream shroud portion 114 of flow control device 100, as seen from radially exterior to downstream shroud portion 114, according to the embodiment of FIG. 1. This depiction includes downstream dam 122, downstream slot panels 132 and 133, downstream reentry slot 136, circumferentially opposing downstream slot walls 144 and 146, and downstream terminus 126, as described in reference to FIG. 1. As can be seen in better detail in FIG. 8, downstream dam 122 is tapered from a base axial thickness at base 121 of downstream dam 122, radially adjacent to downstream shroud portion 114 where downstream dam 122 attaches to downstream shroud portion 114, to a narrower axial thickness extending radially inward from downstream shroud portion 114 to distal end 123 of downstream dam 122.

Figure 9:
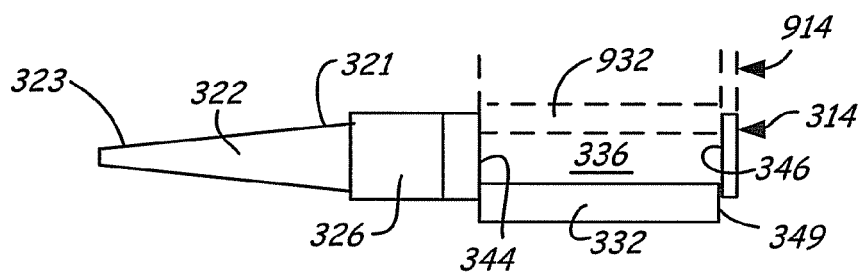
FIG. 9 illustrates a side view of a downstream shroud portion of a flow control device, according to an embodiment.

FIG. 9 illustrates a side view of downstream shroud portion 314 of flow control device 300, as seen from radially exterior to downstream shroud portion 314, according to the embodiment of FIG. 3. This depiction includes downstream dam 322, downstream slot panel 332, downstream reentry slot 336, circumferentially opposing downstream slot walls 344 and 346, downstream terminus 326, and axially protruding downstream slot panel portion 349, as described in reference to FIG. 3. As can be seen in better detail in FIG. 9, downstream dam 322 is tapered from a base axial thickness at base 321 of downstream dam 322, radially adjacent to downstream shroud portion 314 where downstream dam 322 attaches to downstream shroud portion 314, to a narrower axial thickness extending radially inward from downstream shroud portion 314 to distal end 323 of downstream dam 322.

If downstream shroud portion 314 is stacked axially with a downstream shroud portion of an additional, similar flow control device (not depicted in FIG. 9) axially below downstream shroud portion 314, then axially protruding downstream slot panel portion 349 of downstream slot panel 332 is capable of engaging fittingly between circumferentially opposing upstream slot walls of the upstream bypass slot of the additional, similar flow control device (not illustrated in FIG. 9). Conversely, if downstream shroud portion 914 (depicted in outline in FIG. 9) of an additional, similar flow control device is stacked axially above downstream shroud portion 314, then the axially protruding downstream slot panel portion 932 (depicted in outline in FIG. 9) of the additional, similar downstream shroud portion 914 (depicted in outline in FIG. 9) is capable of engaging fittingly between circumferentially opposing downstream slot walls 344, 346, and axially opposing downstream slot panel 332, to define further and serve as a further boundary of downstream reentry slot 336.

Figure 10:
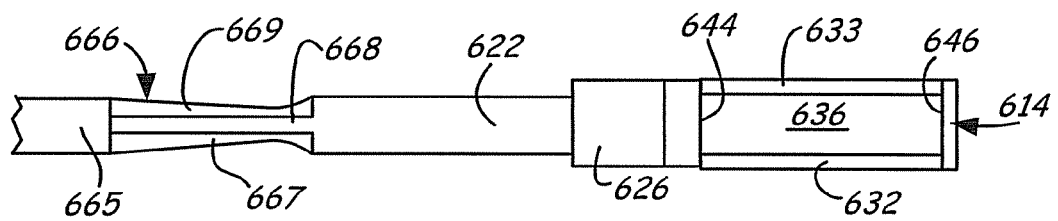
FIG. 10 illustrates a side view of a downstream shroud portion and bridge of a flow control device, according to an embodiment.

FIG. 10 illustrates a side view of downstream shroud portion 614 and bridge 666 of flow control device 600, as seen from radially exterior to the flow control device, according to the embodiment of FIG. 6. This depiction includes downstream dam 622, downstream slot panels 632 and 633, downstream reentry slot 636, circumferentially opposing downstream slot walls 644 and 646, downstream terminus 626, and bridge 666, as described in reference to FIG. 6. As can be seen in better detail in FIG. 10, bridge 666 includes step 668, which extends circumferentially along an axially intermediate portion of radially outer surface 665 of bridge 666. This leaves step 668 as an axially extending divider between thin, axially lower bridge portion 667 and thin, axially upper bridge portion 669 of bridge 666.

Figure 11:
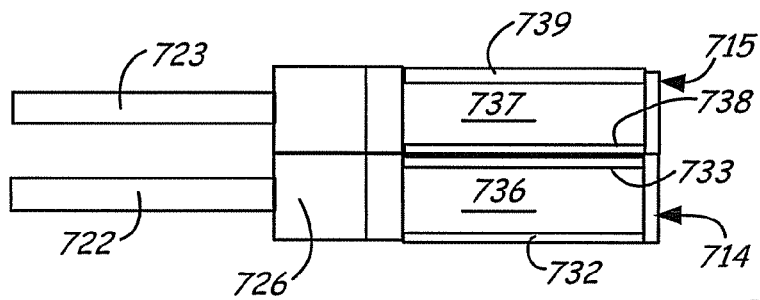
FIG. 11 illustrates a side view of a lower downstream shroud portion and a higher downstream shroud portion of a flow control device, according to an embodiment.

FIG. 11 illustrates a side view of lower downstream shroud portion 714 and higher downstream shroud portion 715 of flow control device 700, as seen from radially exterior to the flow control device, according to the embodiment of FIG. 7. This depiction includes downstream dams 722 and 723, downstream slot panels 732, 733, 738, and 739, downstream reentry slots 736 and 737, and downstream terminus 726. As can be seen in better detail in FIG. 11, and as described in reference to the embodiment of FIG. 4, downstream dams 722 and 723 are not tapered in this embodiment, in contrast to the embodiments of FIG. 8 and FIG. 9, for example.

Figure 12:
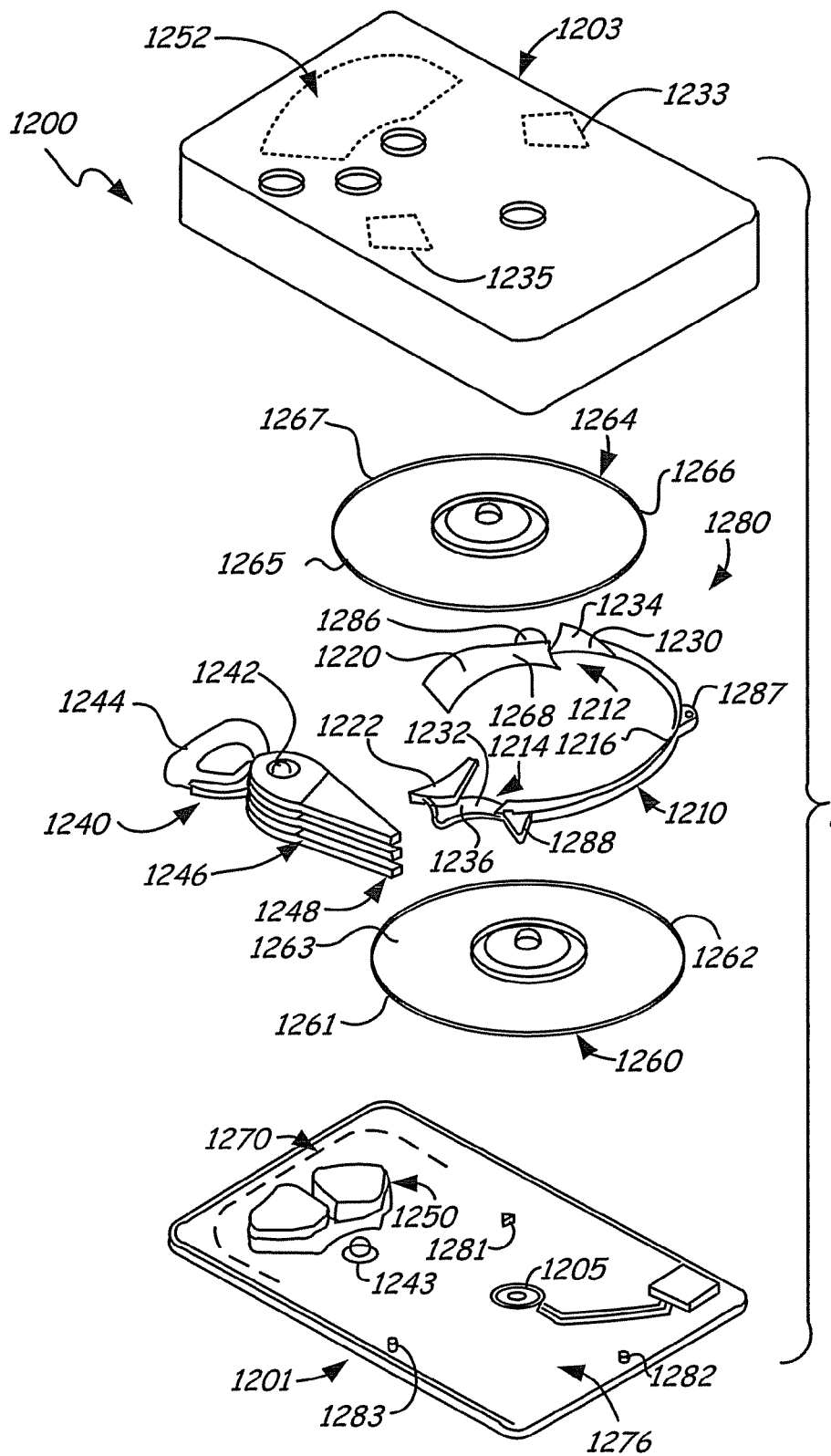
FIG. 12 illustrates an exploded, oblique perspective view of a disc drive incorporating a flow control device, according to another embodiment.

FIG. 12 illustrates an exploded, oblique view of disc drive 1200 incorporating flow control component 1280, according to one embodiment. Disc drive 1200 includes a housing formed of base deck 1201 and top cover 1203. Actuator 1240 is rotatably mounted to base deck 1201 about actuator pivot 1242, which is mounted on actuator boss 1243. Discs 1260 and 1264 are rotatably mounted on hub 1205, with flow control component 1280 mounted partially surrounding discs 1260 and 1264, and with upstream dam 1220, diverter 1268, and downstream dam 1222 disposed between discs 1260 and 1264. Base deck 1201 also includes base deck channel 1270. Top cover 1203 includes second upstream slot panel 1233 and second downstream slot panel 1235 (depicted in dotted lines), formed integrally with top cover 1203, and opposing upstream slot panel 1230 and downstream slot panel 1232, respectively, to further define upstream bypass slot 1234 and downstream reentry slot 1236, respectively. In an alternative embodiment, the slot panels of a flow control component analogous to flow control component 1280 are offset higher than the corresponding slots and abut top cover 1203, while base deck 1201 includes corresponding slot panels to further define upstream bypass slot 1234 and downstream reentry slot 1236.

Many features of flow control component 1280 in FIG. 12 have reference numbers sharing the same last two digits as corresponding features in previous figures, to indicate their similarity. These include partial, circular shroud 1210, upstream shroud portion 1212, downstream shroud portion 1214, intermediate shroud portion 1216, upstream dam 1220, downstream dam 1222, diverter 1268, upstream slot panel 1230, upstream bypass slot 1234, downstream slot panel 1232, downstream reentry slot 1236, diverter 1268. For brevity, descriptions of these features are not repeated, except to indicate certain illustrative differences included in flow control component 1280. For instance, upstream dam 1220 and downstream dam 1222 are both suspended axially between discs 1260 and 1264, and axially adjacent to both disc surface 1263 of disc 1260, and disc surface 1265 of disc 1264.

Actuator 1240 has voice coil 1244 on one side of actuator pivot 1242 about which actuator 1240 is rotatable. When base deck 1201 is attached to top cover 1203, voice coil 1244 sits between axially opposing magnets 1250, 1252 (the latter depicted in dashed lines) to enable the electromagnetically induced rotational actuation of actuator 1240. Other types of actuators, such as linearly actuable actuators, are included in alternative embodiments. Actuator 1240 has suspensions 1246 on the opposing side of actuator pivot 1242, including read/write heads 1248 (or other elements that support a transducer such as a read/write head) at the distal end of actuator 1240, suspended at the ends of suspensions 1246.

Disc drive 1200 further includes discs 1260, 1264 and flow control component 1280. While only two discs 1260, 1264 and one flow control component 1280 are included in the embodiment of FIG. 12, other embodiments occur in which any number of individual discs and flow control components are included, typically with one flow control component between each adjacent pair of discs, and also with a flow control component between the lowermost disc and the base deck, and a flow control component between the uppermost disc and the cover. In some embodiments, interior features of each flow control component, such as those corresponding to upstream dam 1220, downstream dam 1222, and diverter 1268, extend between each adjacent pair of discs in such a disc stack, as well as between the uppermost disc of the disc stack and top cover 1203, and between the lowest disc of the disc stack and base deck 1201, for example. In other embodiments, the flow control features corresponding to those of flow control component 1280 are disposed directly on base deck 1201 and top cover 1203, or formed integrally therewith. While the embodiment of FIG. 12 is directed to a disc drive, a variety of other applications incorporating the present invention may also occur in alternative embodiments, including those involving hard disc drives, floppy discs drives, arrays of disc drives, or other devices affected by circumferential flows, the control of which may be advantageous to the performance of the device.

Discs 1260, 1264 are rotatably mounted on hub 1205, disposed on base deck 1201, when disc drive 1200 is assembled. In alternative embodiments, a wide variety of numbers of discs, with a corresponding number of read/write heads and transducers, may be used. Disc 1260 has opposing surfaces 1261, 1263, and disc 1264 has opposing surfaces 1265, 1267. The read/write heads 1248, suspended at the distal end of actuator 1240, are positioned substantially adjacent to disc surfaces 1261, 1263, 1265, 1267 when the disc drive is assembled. That is, as depicted in FIG. 12, each of the read/write heads 1248 is suspended "above" or "below" its respective disc surface. Each of the read/write heads 1248 is capable of reading data from and writing data to the respective one of disc surfaces 1261, 1263, 1265, 1267, adjacent to which the respective one of the read/write heads 1248 is suspended. These read/write heads may be of any type known in the art, including magnetic, magnetoresistive, giant magnetoresistive (GMR), optical, etc.

Base deck channel 1270, indicated in dashed lines, is abstract and defined by the path of the flow. In an alternative embodiment, components are shaped and arranged on base deck 1201 so that their sides act as channel walls for the base deck channel. In another embodiment, dedicated channel walls are installed on base deck 1201 to constrain base deck channel 1270, where base deck space and assembly technique allows for it. Various embodiments including that depicted in FIG. 12 constrain most of the flow along a path generally following base deck channel 1270, which is streamlined and fairly free of obstructive components that would block the flow path.

Flow control component 1280 is disposed on base deck 1201, radially opposing respective radial peripheries 1262, 1266 of discs 1260 and 1264 and the space between them. As with discs, any number of similar flow control components may be incorporated in disc drive 1200, such as with one flow control component between every pair of adjacent discs, one flow control component below the bottommost disc, and one flow control component above the topmost disc. In one embodiment, the flow control component below the bottommost disc is integrally formed with base deck 1201, and the flow control component above the topmost disc is integrally formed with top cover 1203. Flow control component 1280 is mounted on base deck 1201 via aperture tabs 1286, 1287, 1288, which fasten onto base deck mounts 1281, 1282, 1283, respectively.

Upstream slot panel 1230, defining upstream bypass slot 1234, is disposed on upstream shroud portion 1212, circumferentially toward intermediate shroud portion 1216 from upstream dam 1220, and defines an upstream channel inlet of base deck channel 1270 when disc drive 1200 is assembled. Similarly, downstream slot panel 1232, defining downstream reentry slot 1236, is disposed on downstream shroud portion 1214, circumferentially toward intermediate shroud portion 1216 from downstream dam 1222, and defines a downstream channel outlet of base deck channel 1270 when disc drive 1200 is assembled.

Flow control component 1280 is axially aligned with the discs 1260, 1264, such that the upper surfaces of slot panels 1234 and 1236 are substantially axially coplanar with the upper surface 1263 of disc 1260, and have a small radial separation from disc 1260. Similarly, the lower surfaces of upstream slot panel 1233 and second downstream slot panel 1235 (depicted in dotted lines), formed integrally with top cover 1203, are substantially axially coplanar with the lower surface 1265 of axially adjacent disc 1264 and with very little radial separation from disc 1264.

A path for the flow is thereby created joining the region axially between discs 1260 and 1264 and radially contained within flow control component 1280, with base deck channel 1270, via the interface formed by upstream bypass slot 1234 and the upstream channel inlet of base deck channel 1270, and the interface formed by downstream reentry slot 1236 and the downstream channel outlet of base deck channel 1270. A flow that is unavoidable due to the rotation of discs 1260, 1264 thereby becomes channeled (especially with the aid of diverter 1268 and upstream dam 1220) into a circuitous path that reduces its possible effects on actuator 1240, read/write heads 1248, and discs 1260 and 1264.

Figure 13:
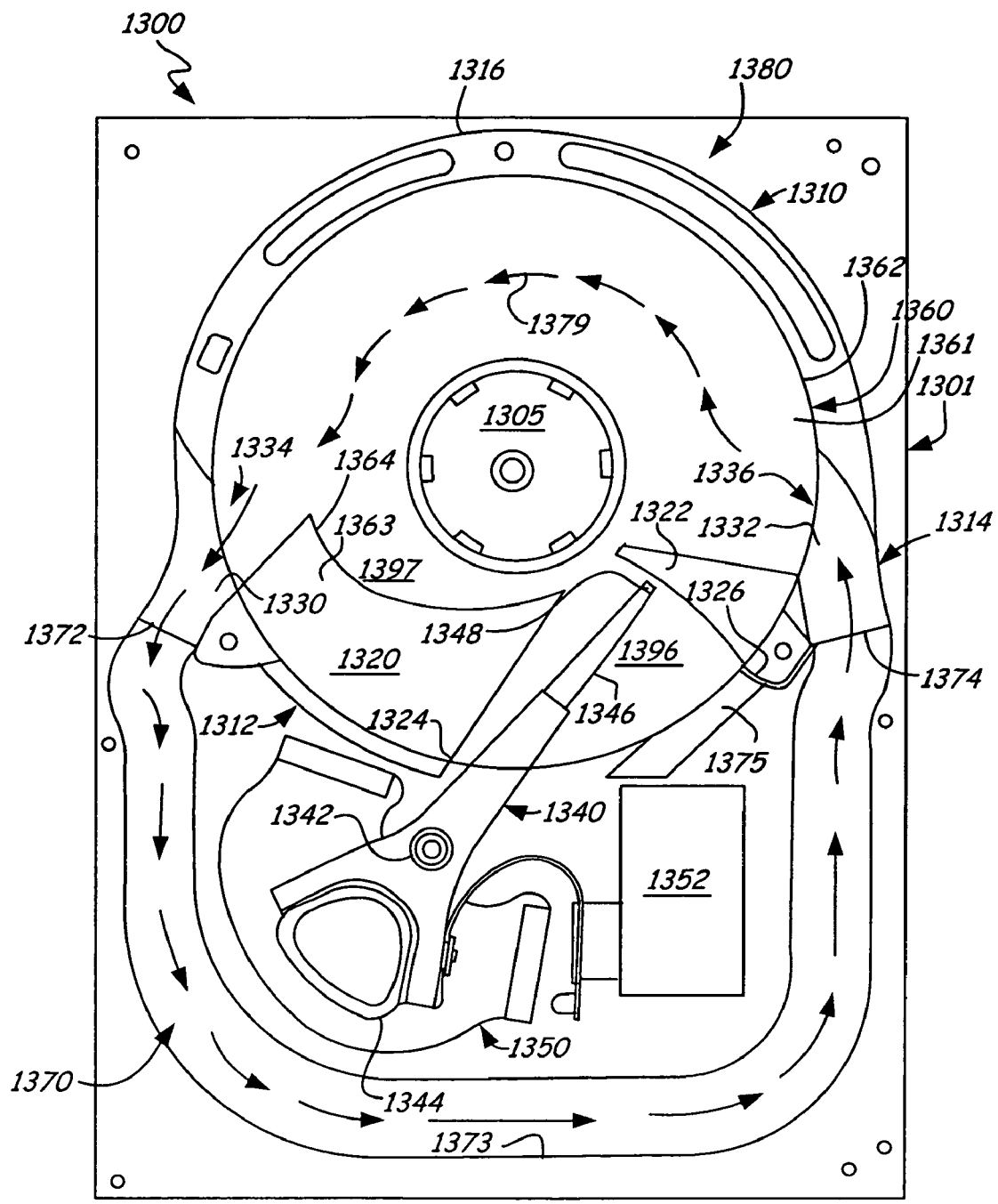
FIG. 13 illustrates a top view of a disc drive incorporating a flow control component, according to another embodiment.

FIG. 13 illustrates a top view of disc drive 1300 incorporating flow control component 1380, according to an embodiment similar to that of FIG. 12. Many features in FIG. 13 have reference numbers sharing the same last two digits as corresponding features in previous figures, to indicate their similarity. These include base deck 1301, actuator 1340, actuator pivot 1342, voice coil 1344, magnet 1350, suspension 1346, read/write heads 1348, disc 1360 having radial periphery 1362, hub 1305, disc surface 1361, upstream channel inlet 1372, downstream channel outlet 1374, partial, circular shroud 1310, upstream shroud portion 1312, downstream shroud portion 1314, intermediate shroud portion 1316, upstream terminus 1324, downstream terminus 1326, upstream dam 1320, downstream dam 1322, diverter 1363 having inner edge 1364, upstream slot panel 1330, upstream bypass slot 1334, downstream slot panel 1332, and downstream reentry slot 1336, in a configuration similar to that of FIG. 12. For brevity, descriptions of these features are not repeated, except to indicate certain illustrative differences included in disc drive 1300.

Disc 1360 is part of a disc pack (not depicted in FIG. 13) rotating at a rotational speed of, as one example, fifteen thousand revolutions per minute, in the present embodiment, although other rotational speeds both lower and higher than this may be found in other embodiments. This is particularly in contemplation of the general trend, in which it is expected that rotational speeds will continue to increase over time. Disc surface 1361 has a plurality of closely packed, substantially circular, circumferentially extended, radially microscopic data tracks (not depicted in FIG. 13), as is generally familiar. Control of the rotational actuation of actuator 1340, and communication between read/write heads 1348 suspended at distal end of actuator 1340 and an external data processing environment (not depicted in FIG. 13), are provided by module 1352.

Read/write head 1348, suspended at the distal end of actuator 1340, is positioned substantially adjacent to disc surface 1361, for reading data from and writing data to disc surface 1361, specifically, from or to one of many data tracks (not depicted in FIG. 13) disposed on disc surface 1361. The circumferential expanse of flow control component 1380 is pre-selected in this embodiment so that upstream terminus 1324 is extended as far circumferentially forward as possible, without threatening to restrict the motion of actuator 1340. Similarly, downstream terminus 1326 is adjacent to the range of motion of read/write head 1348, without threatening to restrict the motion of read/write head 1348.

As depicted in FIG. 13, upstream dam 1320 and downstream dam 1322 are both suspended axially above disc 1360, and axially adjacent to, or above, disc surface 1361. Diverter 1363 acts to significantly block (at least partially) and redirect the flow approaching the diverter due to the rotation of disc 1360 to exit the bounds of flow control component 1380 via upstream bypass slot 1334. Region 1397 between inner edge 1364 of diverter 1363, and hub 1305, also develops an adverse pressure gradient in the direction of flow (i.e. pressure is increasing in the primary direction of flow) because the cross-sectional area of the flow path has a substantial rate of decrease along the flow path. The adverse pressure gradient in the direction of flow in region 1397, in turn, helps slow additional flow into region 1397 and divert more flow from flow path segment 1379 out of the bounds of flow control component 1380 through upstream bypass slot 1334.

Downstream dam 1322 provides additional blockage to retard the flow in region 1396. Upstream dam 1320 or downstream dam 1322 may be tapered circumferentially in the direction of flow (or disc rotation) in different embodiments, to reduce flow fluctuations or vortex shedding.

Region 1396 is further adjoined by downstream wall 1375, disposed on base deck 1401. Downstream radial wall 1375 is substantially proximate to region 1396 between upstream dam 1320 and downstream dam 1322, and radially opposes radial periphery 1362 of disc 1360. Downstream radial wall 1375 further assists in isolating region 1396 from flow radially outward of region 1396, thereby preventing aerodynamic excitation of suspension 1346, read/write heads 1348 and disc 1360. In other embodiments, this wall may be curved or straight, and may be added at a greater distance from disc 1360, especially in positions where it will act to enhance the efficiency of base deck channel 1270.

In other embodiments, for instance, a bridge extends between upstream dam 1320 and downstream dam 1322, helping divert much of the remainder of flow from region 1397 directly past downstream dam 1322 to flow path segment 1379, leaving only axial leakage between upstream dam 1320 and disc surface 1361 (and the disc surface or other surface, not depicted in FIG. 13, axially on the opposite side of upstream dam 1320). Although additional flow will be generated within region 1396 such as due to the shearing of spinning disc 1360 and another disc on the axially opposite side of region 1396, flow within region 1396 is still substantially reduced from what it would be without the flow control features of the present invention.

Upstream slot panel 1330 and downstream slot panel 1332 are each radially extended to include a fin section, and are each axially in line with disc 1360. That is, the surfaces of slot panels 1330 and 1332 are coplanar with disc surface 1361, and begin extremely close to the periphery of disc 1360. They are also axially opposed by additional slot panels, the undersides of which define the ceilings of upstream bypass slot 1334 and downstream reentry slot 1336, with those ceilings axially in line and coplanar with the undersurface of the next disc up in the disc stack, for example. The separation between slot panel 1330 with its axially opposing panel, and between slot panel 1332 with its axially opposing panel, are also equal to the disc-to-disc separation between these two discs in the disc stack, in this embodiment. This helps to ensure a smooth, streamlined flow from the spacing between the discs through upstream bypass slot 1334, and from downstream reentry slot 1336 to the spacing between the discs, without potentially fluctuation-inducing steps between the two.

Similarly, the radially extended fin structure of each of upstream slot panel 1330 and downstream slot panel 1332 maintains a smooth, streamlining boundary to the flow along a radially extended path through upstream bypass slot 1334 and downstream reentry slot 1336, respectively. Such a single, integrated slot panel smoothes the transition for the flow between the vicinity of disc surface 1361 and base deck channel 1370. The radially extended fin structure of upstream slot panel 1330 and downstream slot panel 1332 also helps to reduce the axial, or "Z", component of the flow going through upstream bypass slot 1334 or downstream reentry slot 1336, respectively. Axial, or "Z"-direction, flow in the space between the discs is likely to excite vibrations of the disc 1360, the actuator 1340, the suspensions 1346, and the read/write heads 1348.

Base deck channel 1370 follows a path between upstream channel inlet 1372 and downstream channel outlet 1374, respectively, defined by upstream bypass slot 1334 and downstream reentry slot 1336 of flow control component 1380. Base deck channel 1370 should be as streamlined as possible, having a minimum of sharp angles or other irregularities in its boundaries, and a minimum of components in its path.

Ideally, a circuitous path for the flow is thereby created with little interaction with region 1396 and controlled interaction with disc 1360. The circuitous flow path includes flow path segment 1379 axially above disc 1360, circumferentially between upstream dam 1320 and downstream dam 1322 and radially contained within flow control component 1380, with base deck channel 1370. The circuitous flow path continues from flow path segment 1379 out of the vicinity of disc surface 1361 via upstream bypass slot 1334 and upstream channel inlet 1372, into base deck channel 1370. The circuitous flow path continues along base deck channel 1370 from upstream channel inlet 1372 to downstream channel outlet 1374, and thence through downstream reentry slot 1336 to reenter the vicinity of disc surface 1361 to rejoin flow path segment 1379. This circuitous flow path along flow path segment 1379, upstream bypass slot 1334, base deck channel 1370, and downstream reentry slot 1336 thereby aims to avoid region 1396.

The flow that is unavoidable due to the rotation of disc 1360, along with additional discs (not depicted in FIG. 13) axially stacked with disc 1360 within disc drive 1300, thereby becomes more controlled to allow read/write head 1348, and corresponding read/write heads (not depicted in FIG. 13) suspended in an axial stack at the distal end of actuator 1340, to operate with reduced fluid excitation (commonly referred to as windage disturbance). This in turn allows read/write head 1348 to be flown closer to disc surface 1361 with lower levels of fly height fluctuations and off-track vibrations, thereby increasing the density of the data tracks on the discs of the disc pack, and the linear density of the bits on each track, thereby increasing areal storage density, and improving the total performance of disc drives incorporating such embodiments.

Figure 14:
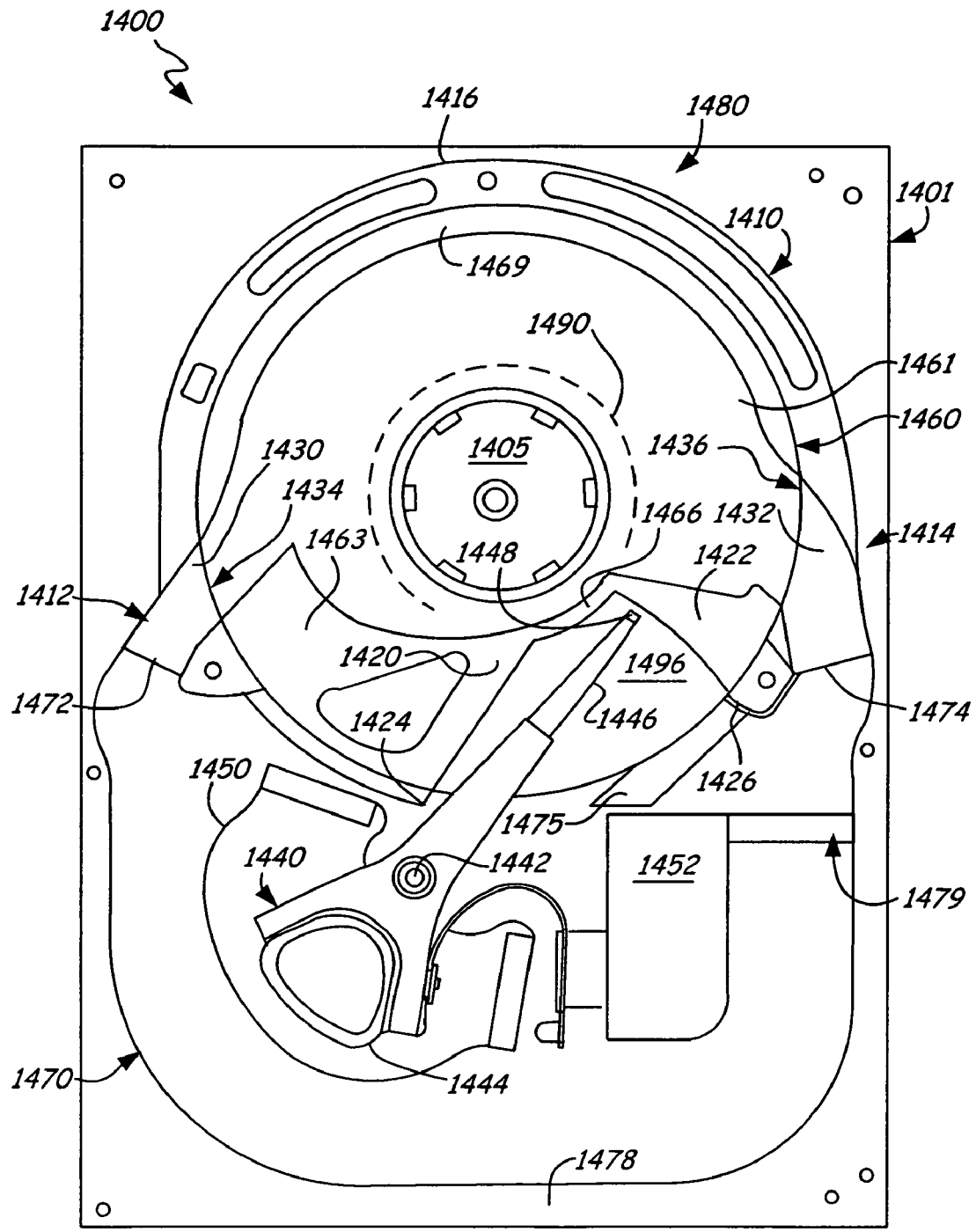
FIG. 14 illustrates a top view of a disc drive incorporating a flow control component, according to an embodiment.

FIG. 14 illustrates a top view of disc drive 1400 incorporating flow control component 1480, according to an embodiment similar to that of FIG. 13. Many features in FIG. 13 are similar to corresponding features in previous figures. These include base deck 1401, actuator 1440, actuator shaft 1442, voice coil 1444, magnet 1450, suspension 1446, read/write head 1448, disc 1460, hub 1405, disc surface 1461, upstream channel inlet 1472, downstream channel outlet 1474, partial, circular shroud 1410, upstream shroud portion 1412, downstream shroud portion 1414, intermediate shroud portion 1416, upstream terminus 1424, downstream terminus 1426, upstream dam 1420, downstream dam 1422, diverter 1463, upstream slot panel 1430, upstream bypass slot 1434, downstream slot panel 1432, downstream reentry slot 1436, and module 1452 in a configuration similar to that of FIG. 13. For brevity, descriptions of these features are not repeated, except to indicate certain illustrative differences included in disc drive 1400, such as separator plate 1469, bridge 1466, and filter 1479.

Disc drive 1400 includes separator plate 1469 disposed on partial, circular shroud 1410, similar for instance to separator plate 478 of FIG. 4. Particularly, separator plate 1469 is disposed on intermediate shroud portion 1416 of partial, circular shroud 1410, extending circumferentially far enough in this embodiment to be attached at its ends to the portions of partial, circular shroud 1410 labeled upstream shroud portion 1412 and downstream shroud portion 1414. Separator plate 1469 is suspended axially above disc surface 1461 of disc 1460, as well as axially adjacent to another disc surface (not depicted in FIG. 14) in the opposing direction, in some embodiments.

Bridge 1466 extends between and connects upstream dam 1420 and downstream dam 1422. Bridge 1466 adds structural rigidity to upstream dam 1420 and downstream dam 1422, lowering the amplitude of their mechanical deflection. This serves, for example, to reduce the probability of contact of upstream dam 1420 and/or downstream dam 1422 with disc 1460 in a shock event. Bridge 1466 also continues the influence of diverter 1463 on the flow influenced thereby, conducting that flow in a path close to hub 1405 to the far side of downstream dam 1422. Bridge 1466 thereby furthers the isolation of region 1496 from the flow. Bridge 1466 may also feature steps, analogous to those described above regarding bridge 466, one disposed on the side of bridge 1466 axially opposing the disc surface 1461 of disc 1460, the other on the axially opposing side of bridge 1466, to axially oppose a surface of an additional disc (not shown in FIG. 14) mounted axially adjacent to disc 1460.

The performance tradeoff of including bridge 1466, according to this embodiment, may be better understood in the context of FIG. 14. Bridge 1466 substantially increases the structural rigidity of upstream dam 1420 and downstream dam 1422, and also substantially increases the shielding of region 1496, while allowing read/write head 1448 access to inner diameter data tracks 1490 along the inner diameter of disc surface 1461.

Base deck channel 1470 is generally defined by the flow path, therefore does not have generally precise boundaries. In this particular embodiment, streamlined base deck wall 1478 and module 1452 are configured to approximate the boundaries of base deck channel 1470.

Base deck channel 1470 has filter 1479 disposed across its path, proximate to downstream reentry outlet 1474 in this embodiment. Filter 1479 traps dust and other particulate matter from the flow passing through base deck channel 1470. Placement of filter 1479 proximate to downstream reentry outlet 1474, and across the path of base deck channel 1470, may enhance this filtering function in some embodiments. Filtering the flow through base deck channel 1470 can, as one benefit, substantially reduce accumulation of chemical contaminants, dust and other particulate matter in the flow. This can significantly reduce the risk of failure in disc drive 1400.

It will be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts and various combinations of various features depicted and described in various embodiments, within the principles of the present invention, to the full extent indicated by the broad general meaning of the terms in which the appended claims are expressed. For example, the particular elements may vary depending on the particular application in which the device is used while maintaining substantially the same functionality without departing from the scope and spirit of the present invention. In addition, although some of the embodiments described herein are directed to a data storage device, such as a multiple disc system, it will be appreciated by those skilled in the art that the teachings of the present invention can be applied to a single disc system or any other data storage or non-data storage application where the device is useful, without departing from the scope and spirit of the present invention.

What is claimed is:

1. A device comprised in a data storage device, comprising:
   a first partial, circular shroud comprising a first upstream shroud portion and a first downstream shroud portion;
   a first upstream slot panel, defining a first upstream bypass slot, disposed on the first upstream shroud portion;
   a first downstream slot panel, defining a first downstream reentry slot, disposed on the first downstream shroud portion;
   a first upstream dam disposed on and extending radially inward from the first upstream shroud portion, and a first downstream dam disposed on and extending radially inward from the first downstream shroud portion; and
   a diverter depending from the first upstream dam and extending radially inward from the first upstream shroud portion, defining a path that is in fluid communication with the first upstream bypass slot.

2. The device of claim 1, wherein the first upstream dam is disposed proximate to an upstream terminus of the first upstream shroud portion, and the first downstream dam is disposed proximate to a downstream terminus of the first downstream shroud portion.

3. The device of claim 1, wherein the first upstream dam is tapered from a base axial thickness radially adjacent to the first upstream shroud portion, to a narrower axial thickness extending radially inward from the first upstream shroud portion, and the first downstream dam is tapered from a base axial thickness radially adjacent to the first downstream shroud portion, to a narrower axial thickness extending radially inward from the first downstream shroud portion.

4. The device of claim 1, further comprising a separator plate disposed on and extending radially inward from a first intermediate shroud portion of the first partial, circular shroud.

5. A device comprised in a data storage device, comprising:
   a first partial, circular shroud comprising a first upstream shroud portion and a first downstream shroud portion;
   a first upstream slot panel, defining a first upstream bypass slot, disposed on the first upstream shroud portion;
   a first downstream slot panel, defining a first downstream reentry slot, disposed on the first downstream shroud portion;
   a first upstream dam disposed on and extending radially inward from the first upstream shroud portion, and a first downstream dam disposed on and extending radially inward from the first downstream shroud portion; and
   a bridge extending between and connecting the first upstream dam and the first downstream dam.

6. The device of claim 5, wherein the bridge comprises a step extending circumferentially along a radially outer surface of the bridge.

7. The device of claim 5, wherein the first upstream dam is disposed proximate to an upstream terminus of the first upstream shroud portion, and the first downstream dam is disposed proximate to a downstream terminus of the first downstream shroud portion.

8. The device of claim 5, wherein the first upstream dam is tapered from a base axial thickness radially adjacent to the first upstream shroud portion, to a narrower axial thickness extending radially inward from the first upstream shroud portion, and the first downstream dam is tapered from a base axial thickness radially adjacent to the first downstream shroud portion, to a narrower axial thickness extending radially inward from the first downstream shroud portion.

9. A device comprising:
   a first partial, circular shroud comprising a first upstream shroud portion and a first downstream shroud portion;
   a first upstream slot panel, defining a first upstream bypass slot, disposed on the first upstream shroud portion;
   a first downstream slot panel, defining a first downstream reentry slot, disposed on the first downstream shroud portion; and
   an upstream slot fin integrally formed with the first upstream slot panel, extending radially outward from the first upstream shroud portion, and a downstream slot fin integrally formed with the first downstream slot panel, extending radially outward from the first downstream shroud portion.

10. The device of claim 9, further comprising a first upstream dam disposed on the first upstream shroud portion.

11. The device of claim 9, further comprising a first downstream dam disposed on the first downstream shroud portion.

12. The device of claim 9, further comprising a second upstream slot panel axially opposing the first upstream slot panel, defining axially opposing sides of the upstream bypass slot, and further comprising a second downstream slot panel axially opposing the first downstream slot panel, defining axially opposing sides of the downstream reentry slot.

13. The device of claim 9, further comprising a separator plate disposed on and extending radially inward from a first intermediate shroud portion of the first partial, circular shroud.

14. A device comprised in a data storage device, comprising:
   a partial, circular shroud comprising an upstream shroud portion and a downstream shroud portion;
   means for guiding a flow radially interior to the partial, circular shroud to pass radially outward from the partial, circular shroud proximate to the upstream shroud portion; and means for guiding a flow radially exterior to the partial, circular shroud to pass radially inward of the partial, circular shroud proximate to the downstream shroud portion, wherein the means for guiding the flow radially interior to the partial, circular shroud to pass radially outward, comprises:

a first upstream slot panel, defining an upstream bypass slot, disposed on the upstream shroud portion;

an upstream dam disposed on and extending radially inward from the upstream shroud portion, proximate to an upstream terminus of the upstream shroud portion; and a diverter depending from the first upstream dam and extending radially inward from the upstream shroud portion, defining a path that is in fluid communication with the first upstream bypass slot.

15. The device of claim 14, wherein the means for guiding the flow radially exterior to the partial, circular shroud to pass radially inward, comprises:

a first downstream slot panel, defining a downstream reentry slot, disposed on the downstream shroud portion; and a downstream dam disposed on and extending radially inward from the downstream shroud portion, proximate to a downstream terminus of the downstream shroud portion.

16. A device, comprising:

a base deck;

a hub disposed on the base deck;

a disc rotatably mounted on the hub;

an actuator, disposed on the base deck, and rotatably actuable for supporting a transducer substantially adjacent to a first surface of the disc;

a base deck channel disposed along a path on the base deck from an upstream channel inlet, adjacent to the disc cavity, to a downstream channel outlet, adjacent to the disc cavity; and a first flow control component disposed on the base deck, comprising:

a partial, circular shroud comprising an upstream shroud portion, and a downstream shroud portion circumferentially opposing the upstream shroud portion, wherein the partial, circular shroud is disposed on the base deck radially opposing a radial periphery of the disc;

an upstream dam disposed on and extending radially inward from the upstream shroud portion, and suspended axially adjacent to the first surface of the disc;

a downstream dam disposed on and extending radially inward from the downstream shroud portion, and suspended axially adjacent to the first surface of the disc;

a first upstream slot panel, defining an upstream bypass slot, disposed coplanar with the disc on the upstream shroud portion, defining the upstream channel inlet; and a first downstream slot panel, defining a downstream reentry slot, disposed coplanar with the disc on the downstream shroud portion, and defining the downstream channel outlet.

17. The device of claim 16, further comprising a diverter disposed on the upstream shroud portion, substantially between the upstream dam and the upstream bypass slot, extending radially inward from the upstream shroud portion.

18. The device of claim 16, further comprising a separator plate disposed on an intermediate shroud portion of the partial, circular shroud, which connects and extends between both the upstream shroud portion and the downstream shroud portion, the separator plate extending radially inward therefrom, and suspended axially adjacent to the first surface of the disc.

19. The device of claim 16, further comprising a bridge extending between and connecting the downstream dam and the upstream dam.

20. The device of claim 16, further comprising a channel wall disposed between the base deck channel and the actuator.

* * * * *